(12) United States Patent
Sandstrom et al.

(10) Patent No.: US 6,866,905 B1
(45) Date of Patent: Mar. 15, 2005

(54) INJECTION BLOW-MOLDED DISPOSABLE TUMBLER AND METHOD OF MAKING SAME

(75) Inventors: Erland R. Sandstrom, Menasha, WI (US); Brigitte K. Weigert, Appleton, WI (US); Donald C. McCarthy, Appleton, WI (US); Michael G. Thomas, Toronto (CA); Michael A. Freek, Bradford (CA)

(73) Assignee: Fort James Corporation, Deerfield, IL (US)

( * ) Notice: Subject to any disclaimer, the term of this patent is extended or adjusted under 35 U.S.C. 154(b) by 0 days.

(21) Appl. No.: 09/437,554

(22) Filed: Nov. 10, 1999

Related U.S. Application Data

(60) Provisional application No. 60/146,354, filed on Aug. 2, 1999, provisional application No. 60/146,352, filed on Aug. 2, 1999, provisional application No. 60/110,240, filed on Nov. 30, 1998, provisional application No. 60/110,239, filed on Nov. 30, 1998, and provisional application No. 60/110,238, filed on Nov. 30, 1998.

(51) Int. Cl.[7] ............................... B32B 1/08; B65D 1/42
(52) U.S. Cl. .................. 428/34.1; 428/35.7; 428/36.92; 220/703; 220/656; 220/658; 220/659
(58) Field of Search ............................. 428/35.7, 36.92, 428/34.1; 220/703, 656, 658, 659

(56) References Cited

U.S. PATENT DOCUMENTS

| | | | |
|---|---|---|---|
| 3,183,552 A | 5/1965 | Farkas | 18/5 |
| 3,339,231 A | 9/1967 | Piotrowski | 18/5 |
| 3,819,314 A | 6/1974 | Marcus | 425/249 |
| 3,951,903 A | 4/1976 | Shaffer | |
| 3,984,498 A * | 10/1976 | McChesney et al. | 260/879 |
| 4,046,836 A | 9/1977 | Adelmann et al. | |
| 4,081,395 A | 3/1978 | Talley | |
| 4,139,517 A | 2/1979 | Zaganiacz | |

(List continued on next page.)

FOREIGN PATENT DOCUMENTS

| | | | |
|---|---|---|---|
| CA | 995418 | 8/1976 | ........................ 18/5 |
| DE | 2 007 552 | 9/1971 | |
| EP | 0 167 660 A2 | 1/1986 | |
| EP | 0 511 617 A1 | 11/1992 | |
| EP | 0 640 646 A1 | 3/1995 | |
| EP | 0 753 540 A2 | 1/1997 | |
| EP | 1 008 528 A2 | 6/2000 | |
| JP | 53-84044 | 12/1976 | |
| JP | 53 064262 | 6/1978 | |
| JP | 59-209520 | 5/1983 | |
| WO | WO 95/02979 | 2/1995 | |

OTHER PUBLICATIONS

Database WPI, Section Ch, Week 199719, Derwent Publications Ltd., London, GB; AN 1997–209397, XP002176702 & JP 09 059367 A.

Patent Abstracts of Japan, vol. 1998, No. 06, Apr. 30, 1998 & JP 10 046021 A.

Patentabstracts of Japan, vol. 017, No. 576 (M–1499), Oct. 20, 1993 & JP 05 169521 A (Sekisui Chem Co Ltd), Jul. 9, 1993.

Kirk–Othmer Encyclopedia of Chemical Technology, Fourth Edition, vol. 19, p. 60.

*Primary Examiner*—Nasser Ahmad
*Assistant Examiner*—Marc Patterson
(74) *Attorney, Agent, or Firm*—Michael W. Ferrell

(57) ABSTRACT

An injection blow-molded disposable tumbler is formed from a polymeric material and includes a fortified upper rim having a thickness greater than the adjacent sidewall. The tumbler may be formed of a variety of resinous materials and exhibits improved toughness and crush resistance as well as aesthetic qualities particulary desired by consumers.

48 Claims, 14 Drawing Sheets

U.S. PATENT DOCUMENTS

| | | | |
|---|---|---|---|
| 4,193,494 A | 3/1980 | Green | 206/217 |
| 4,225,304 A | 9/1980 | Valyi | |
| 4,230,298 A | 10/1980 | Valyi | |
| 4,234,302 A | 11/1980 | Valyi | 125/526 |
| 4,308,086 A | 12/1981 | Valyi | 156/423 |
| 4,446,969 A * | 5/1984 | Tyler | 206/519 |
| 4,513,037 A | 4/1985 | Collins | 428/35 |
| 4,540,543 A | 9/1985 | Thomas et al. | 264/526 |
| 5,145,895 A | 9/1992 | Kohler et al. | 524/160 |
| 5,223,162 A | 6/1993 | Rossio | |
| 5,427,269 A | 6/1995 | Willbrandt | 220/669 |
| 5,433,337 A * | 7/1995 | Willbrandt | 220/669 |
| 5,449,089 A | 9/1995 | Turner et al. | 220/675 |
| 5,466,413 A | 11/1995 | Richter et al. | 264/521 |
| 5,494,952 A | 2/1996 | Hirata et al. | |
| 5,506,046 A * | 4/1996 | Andersen et al. | 428/34.5 |
| 5,693,278 A | 12/1997 | Clements | 264/176.1 |
| 6,001,439 A * | 12/1999 | Kawakami et al. | 428/35.7 |
| 6,047,851 A | 4/2000 | Freek et al. | 220/780 |
| 6,050,509 A | 4/2000 | Clarey et al. | |

* cited by examiner

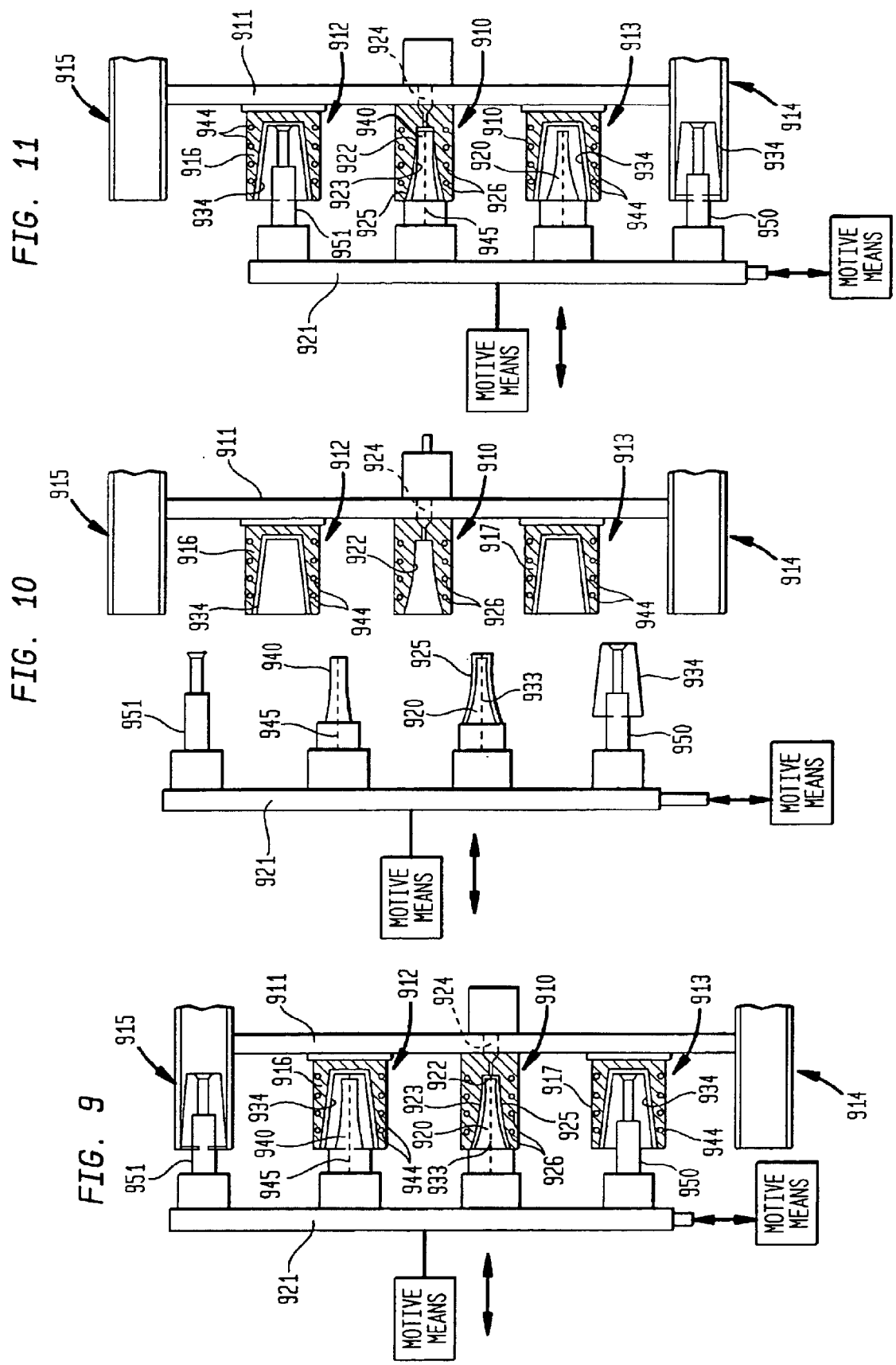

INJECTION BLOW-MOLDED DISPOSABLE TUMBLER AND METHOD OF MAKING SAME

This non-provisional patent application is based on the following provisional applications all filed within one year of the filing date of this application.

| U.S. Serial No. | Title | Filing Date |
|---|---|---|
| 60/110,239 | Low Taper Injection Blow-molded Tumbler | 11/30/98 |
| 60/110,240 | Injection Blow-molded Disposable Tumbler | 11/30/98 |
| 60/110,238 | Large Volume Injection Blow-molded Tumbler | 11/30/98 |
| 60/146,352 | Injection Blow-molded Polycarbonate Containers | 8/2/99 |
| 60/146,354 | Process for Injection Blow-molded Containers | 8/2/99 |

The disclosures of the above applications are hereby incorporated into this application by reference thereto and the priority of the foregoing applications is claimed in accordance with 37 CFR 1.78.

TECHNICAL FIELD

The present invention relates generally to disposable tumblers and in particular to injection blow-molded tumblers of various configurations having a fortified rim at the upper extremity of the sidewall.

BACKGROUND

Disposable polymeric articles for packaging, bowls and cups are well known. Such articles are formed of polystyrene, polypropylene, polyethylene terephthalate and the like and may be made by thermoforming, injection molding, injection blow-molding, or other suitable technique. Injection molding has advantages in that a short cycle time is readily achieved, but tends to be more expensive in terms of material and articles so formed tend to have anisotropic properties and therefore exhibit brittleness. Thermoforming likewise tends to have advantageous cycle times, however, the waste generated tends to be excessive. Moreover, the draw which may be imposed on the sheet is limited. U.S. Pat. No. 5,693,278 discloses thermoformed articles produced from polyethylene terephthalate sheet. The excessive waste problem is addressed in the '278 patent by utilizing at least forty percent (40%) by weight recycled material.

U.S. Pat. No. 5,433,337 of Willbrandt discloses an injection A molded drink container to fit in vehicle cup holders. The container has an upper rim with a height of from about ¹⁄₁₆ of an inch to about ¹⁄₁₀ of an inch and a width of from about 0.15 inches to about 0.25 inches. Note Col. 5 at lines 15–25. U.S. Pat. No. 5,427,269 notes at Col. 5 that this type of container may be produced by an suitable method, but that injection molding is preferred.

As noted hereinabove, injection molding tends to be expensive in terms of material, requiring relatively thick-walled parts to compensate for the anisotropy inherent in the production technique. Disposable containers are preferably made utilizing as little material as possible.

Many consumers are generally reluctant to use conventional disposable drinking cups on a frequent basis due to their "look and feel", their expense, or their performance. Survey data indicate that consumers in many instances prefer disposable articles whose appearance and performance more closely resemble glassware. Conventional disposable drinking cups produced by blow-molding typically rely upon a relatively prominent curled rim to provide rigidity to the article and accordingly, the article does not resemble glassware to the extent desired. Moreover, even with the prominent top-curl, conventional blow-molded cups typically are not rigid enough to mimic glassware. Injection blow-molding processes and apparatus are widely known and widely used in industry. For example, reference may be had to U.S. Pat. No. 3,183,552 to Farkas, U.S. Pat. No. 3,819,314 to Marcus, U.S. Pat. No. 3,339,231 to Piotrowski and Canadian Pat. No. 995,418 to Cannon et al.

It is known, in general, to use injection blow-molding of polycarbonates to produce an assortment of containers, see Kirk-Othmer Encyclopedia of Chemical Technology, Fourth Edition, Vol. 19, p. 600. Further, U.S. Pat. No. 4,139,517 discloses reusable milk bottles composed of aromatic polycarbonates and is specifically directed to a tinted polycarbonate container to prevent milk spoilage caused by artificial light or sunlight. The patent discloses that the containers can be prepared by well-known techniques, such as extrusion blow-molding, injection blow-molding, rotational molding, thermoforming, injection molding and lamination. No specific processing conditions for the mentioned molding techniques are given.

U.S. Pat. Nos. 4,225,304; 4,230,298; 4,234,302 and 4,308,086, issued to Valyi, disclose a continuous process and apparatus for blow-molding, including injection blow-molding, containers formed of various plastics including polycarbonates. Again, no specific process parameters for producing polycarbonate containers are provided. It is and has been a long standing objective of blow-molding processes to achieve a high productivity, i.e., to develop a process with a rapid, efficient and economical operating cycle.

State of the art processes known heretofore are subject to one or more significant disadvantages. Frequently, they are characterized by a relatively slow operating cycle. A shorter operating cycle is particularly desirable since it is directly translatable into a larger number of end products produced. Processes are known with overlapping cycles in order to reduce overall cycle time, for example, by providing that while one parison is being molded another is being blown and still another is being removed. However, even with processes using overlapping cycles the overall cycle time still leaves much to be desired and still necessitates improvement in cycle time. The foregoing difficulties are further compounded by frequent lack of reliability of prior art processes necessitating frequent interruptions of the operation and thereby further impairing operating efficiency.

U.S. Pat. No. 4,540,543 assigned to Canada Cup, Inc., a subsidiary of Fort James Corporation, discloses an injection blow-molding process and apparatus for hollow plastic articles. The method and apparatus for injection blow-molding hollow plastic articles is characterized by a rapid and efficient operating cycle. The injection mold includes a mold cavity and the blow mold is located adjacent the mold cavity in a side-by-side relationship. The parison is injection molded into the mold cavity onto a core. The parison on the core is separated from the mold cavity by moving the parison on the core axially in a straight path away from the mold cavity, followed by movement in a substantially arcuate path into axial alignment with the blow mold, followed by axial movement in a straight path into the blow mold. The advantage of the method and apparatus of injection blow-molding disclosed in U.S. Pat. No. 4,540,543 compared to previous injection blow-molding methods is in its reliability, preventing interruptions of the injection blow-molding operation and thereby improving efficiency. The method and apparatus as disclosed in U.S. Pat. No. 4,540,543 have been used to manufacture thin walled containers from polystyrene. In particular, disposable containers have been successfully produced from polystyrene. Such polystyrene containers are desirable because they are reusable and have aesthetic clarity. However, for producing permanent ware products which have a nominal thickness typically over 50 mils, it has been found that polystyrene was not acceptable because of breakage. When producing blow-molded permaware containers, it is often useful to incorporate onto the base indicia indicating the origin of manufacture or provide other spatial configurations to the base to aid in subsequent processing steps such as printing or packaging. However, for relatively thick bases, the fluid pressure used in blow-molding is not sufficient to adequately press the parison base against a mold and form an adequately deep molded impression on the base. Previously, such base molding step was accomplished by removing the containers from the continuous blow-molding process and stamping the base of the containers in a wholly separate apparatus. Such separate processing adds significant energy and time costs to the overall process.

Accordingly, an object of the present invention is to provide a reusable permanent ware polycarbonate container prepared by injection blow-molding wherein the container mimics glass but is not as breakable when dropped under normal usage.

Another object of the present invention is to provide a reusable, permanent ware injection blow-molded polycarbonate container that has good clarity but is more durable than other plastic containers such as those formed from polystyrene.

A further object of the present invention is to provide a process for injection blow-molding hollow polycarbonate articles characterized by a rapid, efficient and economical operating cycle.

A still further object of the present invention is to provide a process as aforesaid which is convenient and easy to use on a commercial scale and may be reliably used with high productivity.

Still yet another object of the present invention is to provide a process for injection blow-molding hollow articles characterized by a rapid, efficient and economical operating cycle such as provided by U.S. Pat. No. 4,540,543, but use resins other than polystyrene.

A still further object of this invention is to blow mold hollow permaware containers and mold the base of such containers in a continuous process without having to remove the containers from the blow-molding apparatus.

Other objects and advantages of the present invention will become apparent form the following description and drawings.

SUMMARY OF INVENTION

In a first aspect of the invention there is provided an injection blow-molded disposable tumbler exhibiting biaxial toughness formed from a polymeric material comprising: a base forming the bottom of the tumbler defining an outer edge thereof; a sidewall integrally formed with said base extending upwardly from the outer edge thereof defining about its upper extremity a fortified rim.

In one preferred embodiment of the present invention there is provided an injection blow-molded disposable tumbler exhibiting biaxial toughness formed from a polymeric material including: a base forming the bottom of said tumbler defining an outer edge thereof; a sidewall integrally formed with the base extending upwardly from the outer edge thereof having a thickness of from about 5 to about 50 mils defining about its upper extremity a fortified rim; the sidewall extending upwardly with a taper of from about 1.0 to about 4.5 degrees; wherein the fortified rim has a thickness of at least 2 mils greater than the adjacent portion of said sidewall over a height of at least 2 mils. More typically, the sidewall extends upwardly with a taper of from about 2.75 to about 4 degrees; and preferably the sidewall extends upwardly with a taper of about 3 degrees. The fortified rim generally has a thickness and a height of from about 1.5 to about 6 times the thickness of the adjacent portion of the sidewall; with from about 3 to about 5 times the thickness of the adjacent portion of said sidewall being more typical. The tumbler is made from a polymer which is a thermoplastic optically clear polymer, with a haze value of less than 10, usually selected from the group consisting of polystyrene, clarified polypropylene, polyesters, polycarbonates, polyacrylates and styrene acrylonitrile. The volume of said injection blow-molded tumbler is generally from about 1.5 to about 4 times the volume of an injection molded parison from which it was prepared; however, a volume of from about 1.75 to about 3 times the volume of the injection molded parison from which it was prepared is more typical, while a volume of the tumbler of about twice the volume of the injection molded parison from which it was prepared is sometimes preferred. The sidewall has a thickness of from about 10 to about 35 mils, with from about 15 to about 25 mils being more common. A thickness of about 20 mils is preferred in many instances. The sidewall may further include a pattern which alters the cylindrical character thereof over at least a portion of the sidewall which pattern is operative as a grip portion for a user. A ratio of the height of the tumbler to the inside diameter of the upper portion of the sidewall is from about 2 to about 4 in some embodiments, for example, about 3. The tumbler may have a contained volume of from about 12 to about 15 ounces, or inner volume of about 14 ounces. In some embodiments, the tumbler has a height of from about 5.75 to about 6 inches.

In another embodiment, there is provided an injection blow-molded disposable tumbler exhibiting biaxial toughness formed of a polymeric material including: (a) a base forming the bottom of the tumbler defining an outer edge thereof; (b) a sidewall integrally formed with the base extending upwardly from the outer edge thereof having a thickness of from about 5 to about 50 mils defining about its upper extremity a fortified rim; (c) the sidewall extending upwardly with a taper of from about 2.5 to about 10 degrees; wherein the fortified rim has a thickness of at least 2 mils greater than the adjacent portion of the sidewall over a height of at least 2 mils. The sidewall typically extends upwardly with a taper of from about 4.5 to about 10 degrees and preferably the sidewall extends upwardly with a taper of from about 4.5 to about 7.5 degrees. The fortified rim generally has a thickness and a height of from about 1.5 to about 6 times the thickness of the adjacent portion of the sidewall, with from about 3 to about 5 times the thickness of the adjacent portion of said sidewall being more typical. The tumbler is usually formed of optically clear polymer with a haze value of less than 10 selected from the group consisting of polystyrene, clarified polypropylene, polyesters, polycarbonates, polyacrylates and styrene acrylonitrile. The contained volume of the tumbler is generally from about 1.5 to about 4 times the volume of an injection molded parison from which it was prepared; while from about 1.75 to about 3 times the volume of the injection molded parison from which it was prepared is more typical. The tumbler is about twice the volume of the injection molded parison from which it was prepared. The tumbler sidewall has a thickness of from about 10 to about 35 mils in general, whereas, the sidewall has a thickness of from about 15 to about 25 mils in most embodiments. Particularly preferred articles are those wherein the sidewall has a thickness of about 20 mils. The said sidewall may further include a pattern which alters the cylindrical character thereof over at least a portion of said sidewall which pattern is operative as a grip portion for a user. The tumbler typically exhibits a ratio of the height of the tumbler to the inside diameter of the upper portion of the sidewall from about 1 to about 5; whereas from about 1.3 to about 1.7 is preferred. The height of the tumbler is from about 4.6 to about 4.8 inches and it has a typical volume of from about 12 to about 16 ounces; while about 15 fluid ounces is preferred in this embodiment.

In another embodiment, there is provided an injection blow-molded disposable tumbler exhibiting biaxial toughness formed of a polymeric material including; a base forming the bottom of the tumbler defining an outer edge thereof; a sidewall integrally formed with the base extending upwardly from the outer edge thereof having a thickness of from about 5 to about 50 mils defining about its upper extremity a fortified rim; the sidewall extending upwardly with a taper of from about 1 to about 10 degrees; wherein the fortified rim has a thickness of at least 2 mils greater than the adjacent portion of the sidewall over a height of at least 2 mils, said tumbler defining a volume of at least about 16 fluid ounces. More typically, the sidewall extends upwardly with a taper of from about 2.75 to about 9 degrees and preferably with a taper of from about 5 to about 7 degrees. The fortified rim generally has thickness and a height of from about 1.5 to about 6 times the thickness of the adjacent portion of the sidewall, while a thickness and height of from about 3 to about 5 times the thickness of the adjacent portion of the sidewall is preferred. The tumbler is made from a polymeric material which is an optically clear polymer with a haze value of less than 10, selected from the group consisting of polystyrene, clarified polypropylene, polyesters, polycarbonates, polyacrylates and styrene acrylonitrile. The volume of the injection molded tumbler is typically from about 1.5 to about 4 times the volume of an injection molded parison from which it was prepared and the tumbler defines a volume of from about 16–20 fluid ounces.

The present invention is directed in still yet another embodiment to a reusable, permanent ware polylycarbonate container and method of making the polycarbonate container. The polycarbonate container mimics the clarity of glass without having the undesirable fragile property of glass and is more durable than other plastic containers such as polystyrene containers. Thus, the polycarbonate containers or tumblers have the look and feel of glass permaware and can be employed in normal usage without concern for breakage if the container is dropped. The container or tumbler includes a base, a sidewall and a fortified upper rim. The sidewall is integrally formed with the base and extends upwardly from the outer edge thereof. The sidewall is of uniform caliper or thickness of about greater than 50 thousandths of an inch ("mils") to about 500 thousandths of an inch. The tumbler preferably has a mouth (upper rim) which is about as wide or wider than the diameter of the remainder of the tumbler. Such containers are not as easily handled during the blow-molding process as blow-molded bottles and the like in which the mouth of the bottle is substantially less than the diameter of the shoulders and remaining portions of the bottle. At the upper extremity of the sidewall or mouth can be provided a fortified rim which serves to impart additional rigidity to the container. The fortified rim area has a finite width and height both of which exceed the thickness of the adjacent sidewall. While the tumbler is generally cylindrical in overall shape, the tumbler can be provided with either a uniform or non-uniform taper. The tumbler can be embossed to impart a decorative pattern on the sidewall. The permaware polycarbonate container of the present invention is preferably prepared by a side-by-side injection blow-molding method and apparatus as disclosed in U.S. Pat. No. 4,540,543. The patented method comprises: providing an injection mold including a mold cavity formed by a mold wall and a core; injecting molten polycarbonate into the cavity to form a parison on the core; separating said parison from the mold wall by moving the parison on the core axially in a straight path away from the mold wall; providing a blow mold adjacent the mold cavity in side-by-side relationship therewith; moving the parison on the core in a substantially arcuate path into axial alignment with the blow mold; moving the parison on the core axially in a straight path into the blow mold; and expanding the parison on the core in the blow mold at a uniform temperature to form the hollow container. The apparatus comprises: an injection mold including a mold wall; a core engageable with said injection mold to form a mold cavity with the mold wall; means to inject molten polycarbonate into the mold cavity to form a parison therein; a blow mold adjacent the mold cavity in side-by-side relationship therewith; means to separate the parison from the mold wall operative to move the parison axially in a straight path away from the mold wall, followed by in a substantially arcuate path into axial alignment with the blow mold, followed by axially in a straight path into the blow mold; and means to expand the parison on the core in the blow mold to form the hollow container. The core is preferably separated from the hollow container leaving the container in the blow mold and returned to the injection mold for another cycle along paths corresponding to the foregoing path, i.e., axially, substantially arcuate and axially into the injection mold. An ejection station may then be provided adjacent the blow mold in side-by-side relationship. An ejection core can transfer the hollow container from blow mold to ejection station and return along paths corresponding to the paths of the core. In one embodiment, a second core, second ejection station, second blow mold and second ejection core are provided on the side opposed to the blow mold and ejection station for operation of an overlapping cycle. The second core and second ejection core move on paths corresponding to the paths of the core and ejection core. That is, when the core is in the blow mold the second core is in the injection mold. A major advantage of the patented blow-molding process resides in the rapid operating cycle enabled by the critical movement paths. Also, the process and apparatus are simple, convenient to operate and reliable. The resultant high productivity is a significant feature. In this aspect of the invention a method of forming a durable polycarbonate permaware container includes: (a) injecting molten polycarbonate into a mold cavity formed by a mold wall and a core to form a polycarbonate parison on the core; separating the parison from the mold wall by moving the parison on the core axially in a straight path away from the mold wall; moving the parison on the core in a substantially arcuate path into axial alignment with a blow mold which is in a side-by-side relationship with the mold cavity; moving the parison on the core axially in a straight path into the blow mold; and expanding the parison on the core in the blow mold at a uniform temperature to form a hollow container having a sidewall integrally formed to a base and a fortified rim, the sidewall having a uniform thickness of from about greater than 50 mils to about 500 mils. More typically, the sidewall has a uniform thickness of from about 75 mils to about 375 mils. In most instances, the polycarbonate is injected into the mold cavity at a temperature of from about 450° F. to about 700° F. and more typically, at a temperature of from about 500° F. to about 650° F. In general, the molten polycarbonate is injected into the mold cavity at a pressure of about 1,000 to 3,000 psi and in a preferred embodiment at an injection pressure of about 2,100 psi. The parison is expanded at a uniform temperature of from about 250° F. to about 500° F., at a pressure of from about 100 to about 500 psi. Typically, the polycarbonate comprises aromatic homopolycarbonate or aromatic copolycarbonate resins with a melt flow rate of from about 10 to 22 g/10 min. The polycarbonate tumbler is an injection blow-molded polycarbonate permaware hollow container comprising: a base forming the bottom of the container defining an outer edge thereof; a sidewall integrally formed with the base extending upwardly from the outer edge thereof and having a thickness of from about over 50 to about 500 mils to a fortified rim about its upper extremity. The fortified rim has a thickness of at least 2 mils greater than an adjacent portion of the sidewall over a height of at least 2 mils. Both the width and height of the fortified rim are from about 1.1 to about 4 times a thickness of an adjacent sidewall. In a particularly preferred article, both the width and the height of the fortified rim are about 100 mils and the adjacent sidewall is about 80 mils. The base is from about 1.1 to about 8 times the thickness of the sidewall. The permaware polycarbonate container is preferably one wherein the bottom of the base has integrally molded thereto indicia or a configuration different from the remaining base. A particularly preferred method of forming a container having a wall thickness greater than 50 mils comprises: blowing a parison in a blow mold shaped in the form of said container; inserting within said blown container a core which presses the base of said container against a mold face having thereon indicia or other structural configurations so as to mold said indicia or other mold configurations onto the outside surface of the base. Most preferably, the parison is formed from a polycarbonate plastic and the parison is blown by directing fluid pressure initially at the top of the parison and directing the fluid pressure from the top toward said base of said parison.

The present invention is directed in still yet another aspect to improvements in forming permaware containers by a continuous blow-molding process. The invention is also directed to improvements in the blow-molding process as disclosed in U.S. Pat. No. 4,540,543 so as to form containers from resins other than polystyrene.

The present invention is characterized in these latter aspects as a side-by-side injection blow-molding method and apparatus and is at least in part disclosed in U.S. Pat. No. 4,540,543. The patented method comprises: providing an injection mold including a mold cavity formed by a mold wall and a core; injecting molten resin into the cavity to form a parison on the core; separating said parison from the mold wall by moving the parison on the core axially in a straight path away from the mold wall; providing a blow mold adjacent the mold cavity in side-by-side relationship therewith; moving the parison on the core in a substantially arcuate path into axial alignment with the blow mold; moving the parison on the core axially in a straight path into the blow mold; and expanding the parison on the core in the blow mold at a uniform temperature to form the hollow container. The apparatus comprises: an injection mold including a mold wall; a core engageable with said injection mold to form a mold cavity with the mold wall; means to inject molten resin into the mold cavity to form a parison therein; a blow mold adjacent the mold cavity in side-by-side relationship therewith; means to separate the parison from the mold wall operative to move the parison on the core axially in a straight path away from the mold wall, followed by in a substantially arcuate path into axial alignment with the blow mold, followed by axially in a straight path into the blow mold; and means to expand the parison on the core in the blow mold to form the hollow container. The core is preferably separated from the hollow container leaving the container in the blow mold and returned to the injection mold for another cycle along paths corresponding to the foregoing path, i.e., axially, substantially arcuate and axially into the injection mold. An ejection station may then be provided adjacent the blow mold in side-by-side relationship. An ejection core can transfer the hollow container from blow mold to ejection station and return along paths corresponding to the paths of the core. In an additional embodiment, a second core, second ejection station, second blow mold and second ejection core are provided on the side opposed to the blow mold and ejection station for operation of an overlapping cycle. The second core and second ejection core move on paths corresponding to the paths of the core and ejection core. That is, when the core is in the blow mold the second core is in the injection mold. Obviously, additional cores, ejection stations, blow molds, and ejection cores can be provided and operated in an overlapping cycle to increase productivity. A major advantage of the patented blow-molding process resides in the rapid operating cycle enabled by the critical movement paths. Also, the process and apparatus are simple, convenient to operate and reliable. The resultant high productivity is a significant feature.

In accordance with this invention, the above patented process is used to form injection blow-molded containers formed of polymers other than polystyrene. Thus, it has been found that the above patented process can be used to form clear containers from resins such as polycarbonate, polyethylene terephthalate, polycarbonate/ABS mixed resin, acrylic resins, clarified (amorphous) polypropylene and polyvinylchloride. Additionally, the present invention is directed to a process of molding the base of a blown container without removing the container from the blow mold. In this invention, after the parison is blown to the container in the blow cavity, an ejection core is inserted into the container while the container remains in the blow cavity. The ejection core pushes the base of the container against a mold opposed to the outside surface of the container base. The mechanical pressure of the ejection core against the container base is sufficient to adequately transfer the molded configuration of the mold onto the outside surface of the container base. Once the base is molded, the container can be removed from the blow cavity by the ejection core on a continuous basis. The continuous process saves considerable time and energy over prior art processes which required a stamping step after the container had been removed from the blow cavity. There is thus provided a method of forming a container comprising: injecting molten resin into a mold cavity formed by a mold wall and a core to form a resinous parison on the core; separating the parison from the mold wall by moving the parison on the core axially in a straight path away from the mold wall; moving the parison on the core in a substantially arcuate path into axial alignment with a blow mold which is in a side-by-side relationship with the mold cavity; moving the parison on the core axially in a straight path into the blow mold; and expanding the parison on the core in the blow mold at a uniform temperature to form a hollow container; wherein the resin is selected from the group consisting of filled polystyrene, filled and non-filled polycarbonate, polyethylene terephthalate, polycarbonate and ABS mixtures, acrylic resins, clarified polypropylene and polyvinylchlroide. The filled resins contain up to 5 wt. % of nanometer-sized particles which may comprise a clay. In one embodiment, a transparent drinking tumbler is comprised of polystyrene filled with nanometer-sized particles having a size within the range of visible-light wavelengths. In another aspect, there is provided a method of forming a container having a wall thickness greater than 50 mils, the container containing sidewalls and an integrally formed base, the method comprising: blowing a parison in a blow mold shaped in the form of the container to form a hollow container, inserting within the hollow container, which remains in the blow mold, a core which presses the base of the container against a mold face having thereon indicia or other structural configurations so as to mold the indicia or other mold configurations onto the outside surface of the base. Another method involves forming a container comprising: (a) injecting molten resin into a mold cavity formed by a mold wall and a core to form a resinous parison on the core; (b) separating the parison from the mold wall by moving the parison on the core axially in a straight path away from the mold wall; (c) moving the parison on the core in a substantially arcuate path into axial alignment with a blow mold which is in a side-by-side relationship with the mold cavity; (d) moving the parison on the core axially in a straight path into the blow mold; and (e) expanding the parison on the core in the blow mold by directing fluid initially at the top of the parison and directing the fluid pressure from the top toward the base of the parison at a uniform temperature to form a hollow container; there the resin is selected from the group consisting of polycarbonate, polyethylene terephthalate, polycarbonate and ABS mixtures, acrylic resins, clarified polypropylene and polyvinylchloride.

In still further embodiments of the present invention, there is provided an injection blow-molded tumbler with a fortified rim having a thickness greater than the adjacent sidewall formed of a polymeric material including a styrene/butadiene copolymer. In general, the copolymer is from about 2 to about 40 percent by weight butadiene residue with from about 8 to about 15 percent by weight butadiene residue in the composition being typical. The tumbler may consist entirely of butadiene/styrene copolymer, or the copolymer may be blended with other polymers, for example, polystyrene.

Alternatively, polystyrene or other polymeric composition may be provided with an impact modifier. Typically, impact modifiers may be core-shell polymers, olefin containing copolymers, rubber polymers, rubber copolymers, styrene containing copolymers and mixtures thereof. So also, the inventive tumblers may be made from filled polymeric compositions including conventional filler such as mica, talc and the like. Suitable filled compositions may include from 5 to 50 weight percent filler, with from about 8 to about 20 percent filler being more typical. From about 10 to about 15 weight percent filler is perhaps most suitable for the injection blow-molded tumblers.

BRIEF DESCRIPTION OF DRAWINGS

The invention is described in detail below with reference to numerous examples and drawings. In the drawings:

FIG. 9 is an elevational view showing in more detail an apparatus preferably used in the present invention to form tumblers of the present invention, the apparatus being in the closed position with the core in the injection mold;

FIG. 10 is a view similar to FIG. 9 with the apparatus in the open position with the core and parison in the midst of transfer to the blow mold;

FIG. 11 is a view similar to FIG. 9 with the apparatus in the closed position with the core and parison in the blow mold and with the second core in the injection mold;

DETAILED DESCRIPTION

The invention is described below in connection with various embodiments and aspects. Modifications to particular embodiments within the spirit and scope of the present invention, which is set forth in the appended claims, will be apparent to those of skill in the art.

Disposable tumblers in accordance with the present invention more closely resemble conventional glassware and mimic its rigidity, performance and "look and feel" than do previously known blow-molded articles. Salient features include the biaxial-induced toughness of the blow-molded article, as well as rigidity achieved by combing a relatively low taper with a fortified upper rim. Conventional blow-molded cups typically include a very prominent curled lip which is not consistent with glassware and tends to make the article unappealing for everyday use or for use with guests.

Figure 1A:
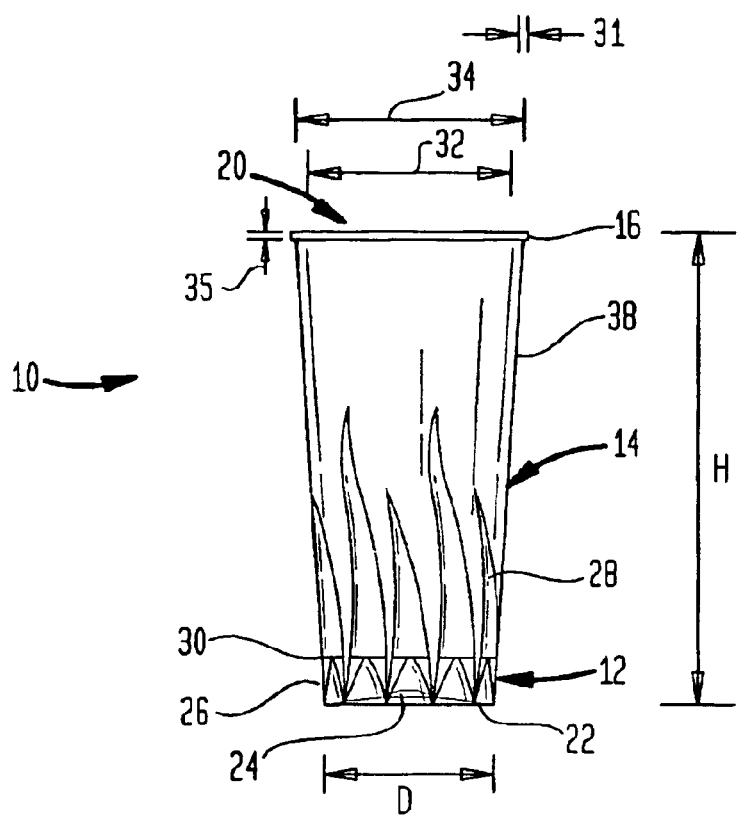
FIG. 1(a) is a view in elevation of a tumbler produced in accordance with the present invention.
Figure 1B:
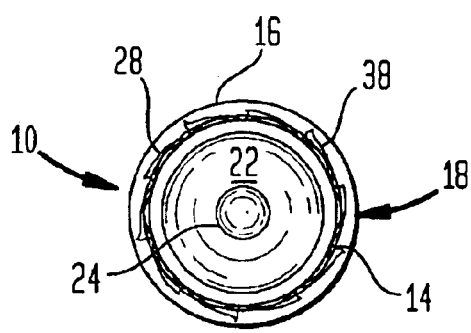
FIG. 1(b) is a plan view of the bottom of the tumbler of FIG. 1(a)
Figure 1C:
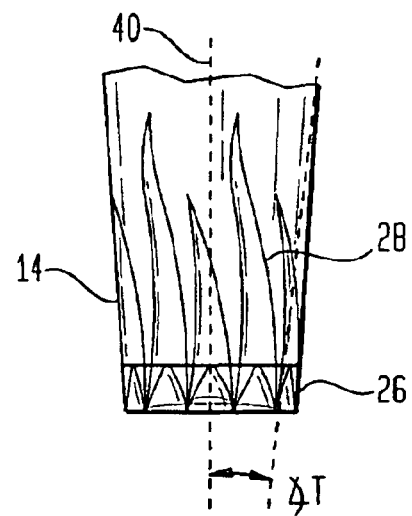
FIG. 1(c) is a partial view in elevation of the tumbler of FIG. 1(a) showing the molded-in design of the tumbler of FIG. 1(a) and illustrating the taper of the tumbler.

There is shown in FIGS. 1(a) through 1(c) a tumbler 10 constructed in accordance with the present invention. In general, tumbler 10 has a base portion 12, a sidewall portion 14 and an upper circular rim portion 16 which extends about the periphery 18 of an opening 20 of tumbler 10. Base portion 12 of tumbler 10 is integrally formed with the rest of the tumbler and includes a bottom 22 which has a meniscus portion 24 and a base sidewall 26. Base sidewall 26 is typically thicker than sidewall 14, and has substantially zero taper.

Tumbler 10 is optionally provided with a molded-in design 28 which is more clearly seen by reference to FIGS. 1(b) and 1(c). Base sidewall 26 extends upwardly to define an outer edge 30 which attaches to sidewall 14 extends upwardly to fortified rim 16. Rim 16 is integrally formed with sidewall 14 and is a continuous generally circular or oval, solid polymer bead extending about periphery 18 opening 20. Rim 16 has a width indicated at 31 which is defined by the difference between an inner diameter 32 and an outer diameter 34 of rim 16 and a height 35 which is the distance over which the width indicated at 31 extends. The width at 31 is thicker than adjacent sidewall portion 38 which is typically of the same caliper as the rest of sidewall 14. In the example shown in FIGS. 1(a)–1(c), adjacent sidewall portion 38 has a thickness of 10 mils, height 35 is approximately 28 mils and the width at 31 is approximately 40 mils at its thickest point.

Other dimensions of tumbler 10 are indicated on FIG. 1(a). Base portion 12 has a diameter D, at edge 30 of about 2.125 inches, an outer upper diameter 34 of 2.770 inches an inner upper diameter 32 of 2.730 inches. The overall height, H, of tumbler 10 is 5.785 inches. These dimensions define an angle of taper T as shown about imaginary central axis 40 of about 3° for sidewall 14 of tumbler 10. As used herein "taper", "degree of taper" and like terminology indicates the angle that the sidewall of the inventive tumbler makes with the imaginary central longitudinal axis defined by the sidewall which is substantially perpendicular to bottom 22, the taper of the article may also be thought of as the angle the sidewall makes with the bottom less 90 degrees.

FIG. 1(c) shows a molded in swirl design 28 which extends from base portion 12 to roughly 50 percent of the height of tumbler 10. Design 28 is comprised of wall embossments at least as prominent as ½ the caliper of sidewall 14 and typically of the same thickness or prominence of the sidewall. Thus, design 28 substantially alters the topography of sidewall 14 and provides a secure grip for a user, as well as a modicum of longitudinal reinforcement.

Figure 2A:
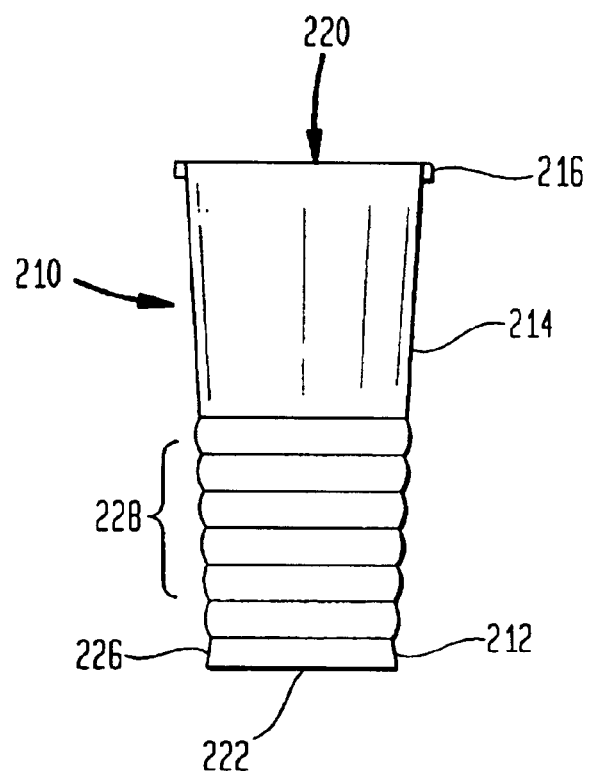
FIG. 2(a) is a view in elevation of another tumbler constructed in accordance with the present invention.
Figure 2B:
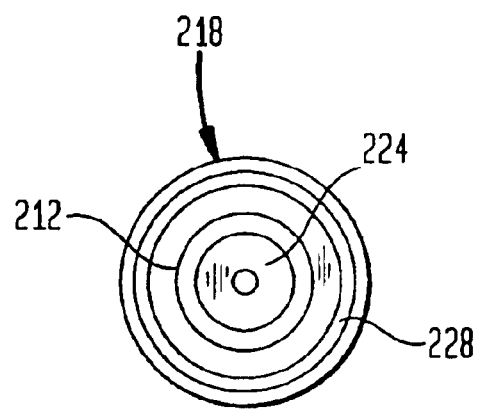
FIG. 2(b) is a plan view of the bottom of the tumbler of FIG. 2(a)

There is shown in FIGS. 2(a) and 2(b) another tumbler 210 constructed in accordance with the present invention. In general, tumbler 210 has a base portion 212, a sidewall portion 214 and an upper circular fortified rim portion 216 which extends about the periphery 218 of an opening 220 of tumbler 210. Base portion 212 of tumbler 210 is integrally formed with the rest of the tumbler and includes a bottom 222 which has a meniscus portion 224 and a base sidewall 226. Base sidewall 226 is typically thicker than sidewall 214, and has slightly reversed taper as opposed to the taper of sidewall 214.

Tumbler 210 is provided with a molded-in design 228 which is a series of concentric rings as shown on FIGS. 2(a) and 2(b). The dimensions of tumbler 210 are otherwise substantially identical to the dimensions of the tumbler 10 of FIGS. 1(a)–1(c).

There is shown in FIGS. 3(a) through 3(d) a tumbler 310 constructed in accordance with the present invention. In general, tumbler 310 has a base portion 312, a sidewall portion 314 and an upper circular fortified rim portion 316 which extends about the periphery 318 of an opening 320 of tumbler 310. Base portion 312 of tumbler 310 is integrally formed with the rest of the tumbler and includes a bottom 322 which has a meniscus portion 324 and a base sidewall 326. Base sidewall 326 is thicker than sidewall 314 and has a slight taper.

Figure 3A:
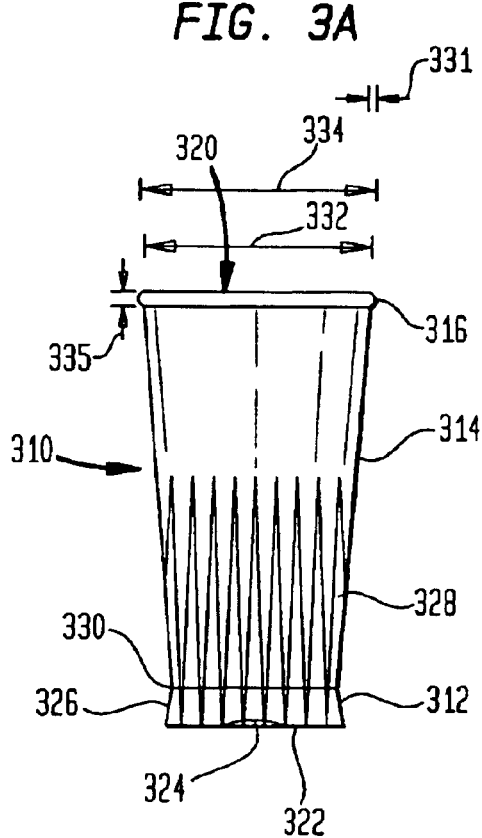
FIG. 3(a) is a view in elevation of yet another tumbler constructed in accordance with the present invention.
Figure 3B:
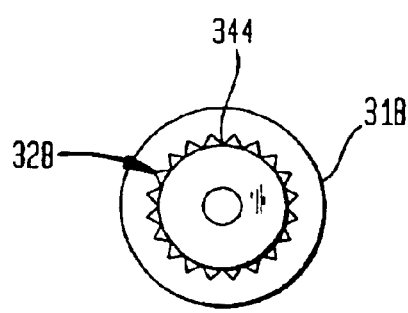
FIG. 3(b) is a plan view of the bottom of the tumbler of FIG. 3(a)
Figure 3C:
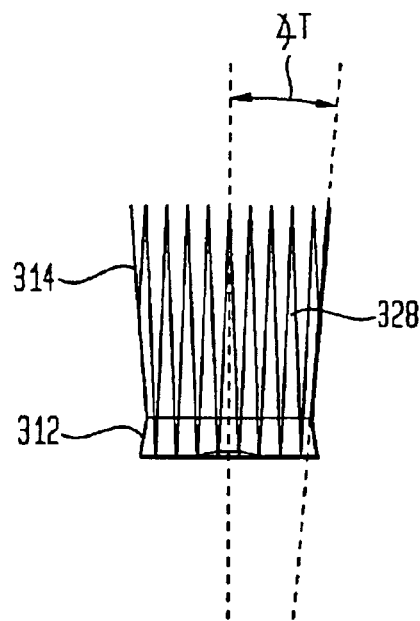
FIG. 3(c) is a partial view in elevation of the tumbler of FIG. 3(a) showing the molded-in design and illustrating the taper of the tumbler.

Tumbler 310 is optionally provided with a "cut-glass" molded-in design 328 which is most clearly seen by reference to FIGS. 3(b) and 3(c). The molded in design defines a series of triangular ridges which are deeper in dimension than the wall caliper of sidewall 314, thus providing strength by way of corrugation. The molded in cut glass grooves 328 have a wall thickness the same as the rest of the tumbler and a depth of up to about ⅛ inch as shown.

Base sidewall 326 extends upwardly to define an outer edge 330 which attaches to sidewall 314. Sidewall 314 extends upwardly to fortified rim 316. Rim 316 is integrally formed with sidewall 314 and is a continuous generally circular or oval, solid polymer bead extending about periphery 318 of opening 320. Rim 316 has a width indicated at 331 which is defined by the difference between an inner diameter 332 and an outer diameter 334 of rim 316 and a height indicated at 335 which is the longitudinal distance over which the width at 331 extends. The width at 331 is thicker than adjacent sidewall portion 338 which is typically of the same caliper as the rest of sidewall 314. In the example shown, adjacent sidewall portion 338 has a thickness of 20 mils, the height at 335 of the rim is approximately 28 mils and the width at 331 is approximately 40 mils at its thickest point. Other dimensions of tumbler 310 are approximately identical to those of tumblers 210 of FIGS. 2(a) and 2(b) and tumbler 10 of FIGS. 1(a)–1(c). Tumbler 310 thus has a taper of Tumbler 310 is particularly rigid due to the triangular ridge "cut glass" pattern 328 which extends upwardly from the base over about 40% of the height of the glass, forming a grip for the user, as can best be appreciated from FIG. 3(b). As can be seen from FIG. 3(b), the ridges are accordion shape when viewed in section, wherein segments have flat surfaces 344 having a width of one quarter of an inch or so.

Figure 3D:
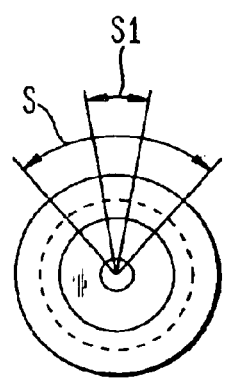
FIG. 3(d) is a schematic view illustrating the angular relationships of the design of FIGS. 3(a)–(c)

As shown in FIGS. 3(c) and 3(d), there is an angle, S, between connected segments of 130 degrees and each triangular segment extends over an angle S1 of about 15 degrees of the periphery of the tumbler.

Figure 4A:
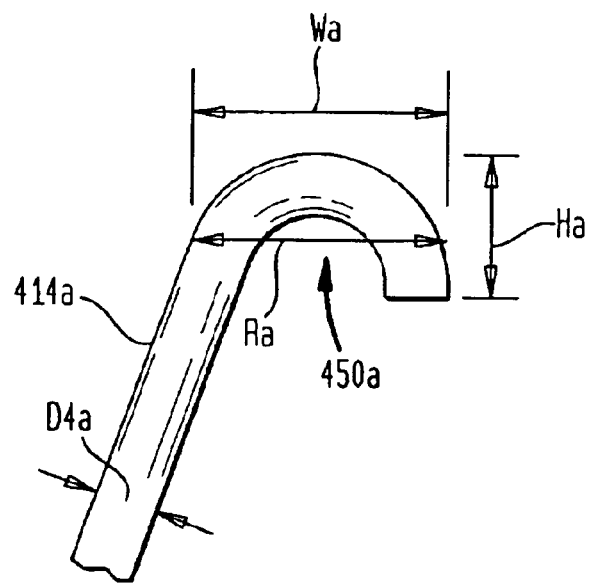
FIG. 4(a) is a schematic view illustrating the "lip curl" of a conventional blow-molded plastic cup.

Referring to FIG. 4(a), there is schematically depicted a lip curl characteristic of prior art disposable drinking cups. In general, such prior art cups have a sidewall 414a of a given thickness $D_{4a}$ which extends upwardly into a curl generally indicated at $450_a$. The curl has a characteristic radius $R_a$ as well as a height $H_a$ and a width $W_a$. Such structures are sometimes called "open top curls" and may be seen, for example, in U.S. Pat. No. 4,540,543. See FIG. 4 thereof at 31.

Figure 4B:
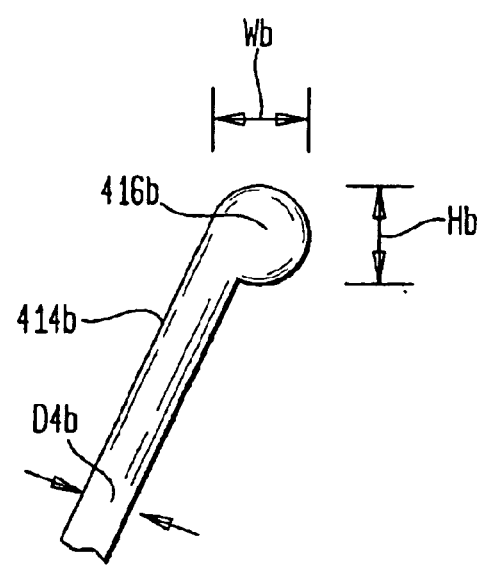
FIG. 4(b) is a schematic view illustrating the solid-bead fortified rim of a tumbler produced in accordance with the present invention.

FIG. 4(b) schematically depicts in section and elevation a solid polymer bead about the upper periphery of a tumbler, that is, an embodiment of the fortified rim of the present invention which extends around the upper periphery of the inventive tumbler. The tumbler has a sidewall 414b of thickness $D_{4b}$. The fortified rim, 416b is formed of solid polymer integrally formed with sidewall 414b and has a height $H_b$ and width $W_b$ as indicated. Inasmuch as the cross section of the embodiment shown in circular, the width $W_a$ is approximately equal to the height $W_b$.

Bead 416b has advantages over the prior art top curl, whether or not one is seeking to mimic glassware. For one, it rounded and will not tend to snag on the mold or snag with a cup cover as to prior art top-curls. For another advantage, a bead type top rim can more compactly provide rigidity to a cup than does a top curl, with less width. While polymer bead 416b is shown as circular in cross section, other profiles may be suitable for example, conic sections such as ellipsoid shapes of truncated conic sections or profiles such as truncated conic section including a semi-circle or a half ellipse.

As noted above, tumblers in accordance with the present invention are produced by injection blow-molding. Optically opaque materials may be used, however, optically transparent polymers are usually preferred. Particularly preferred polymers include crystal polystyrene available from Dow Corporation, Midland, Mich., grade 685d this polymer may be used to produce the inventive tumblers by the method of U.S. Pat. No. 4,540,543, the disclosure of which is incorporated herein by reference. The subject apparatus and method is generally shown and described in connection with FIG. 5.

Figure 5:
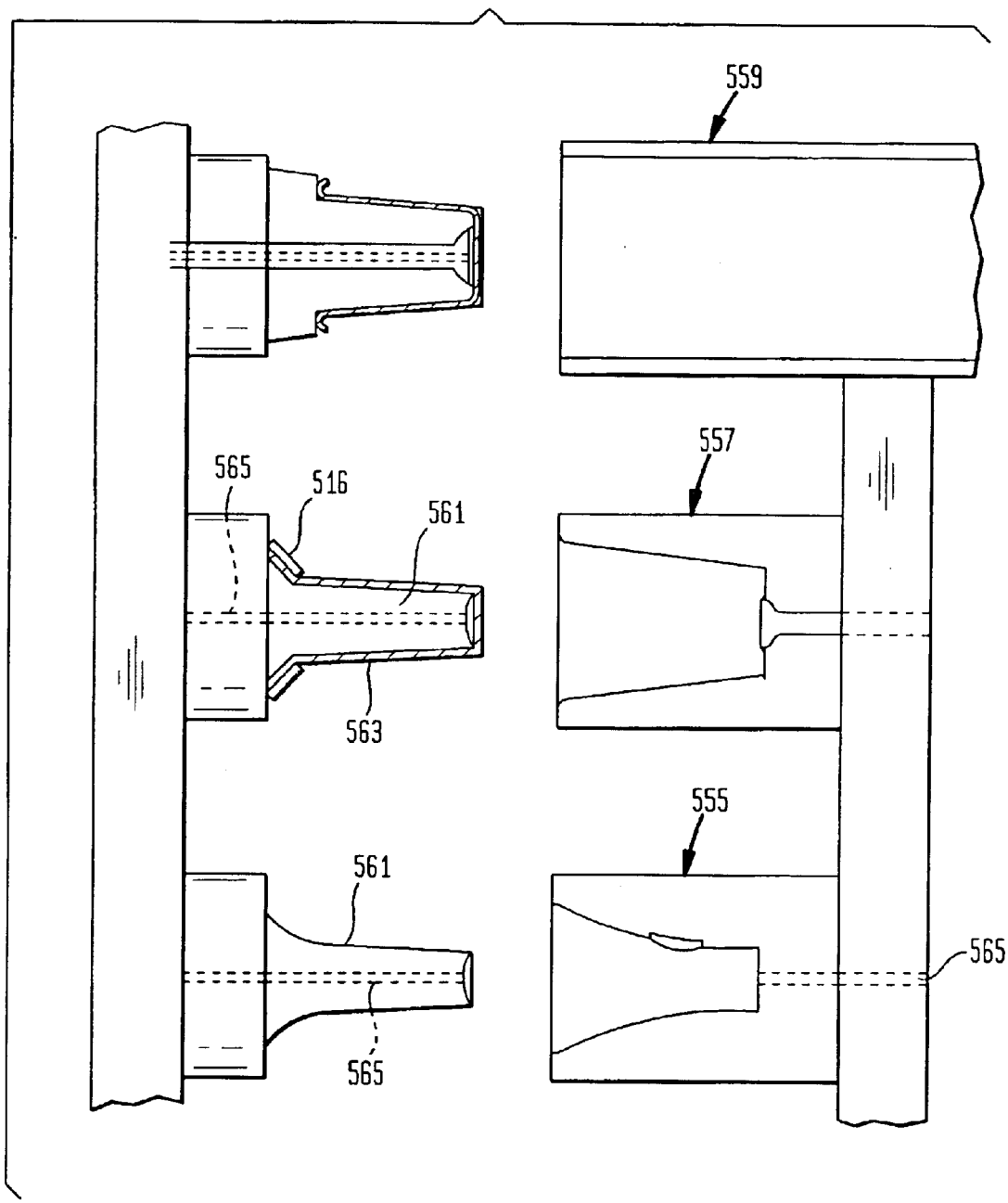
FIG. 5 is a schematic drawing illustrating the manufacture of a tumbler in accordance with the present invention.

There is illustrated in FIG. 5 an injection mold 555, a blow mold 557 and an ejection station 559. Together with core 561, mold 555 defines an injection mold cavity wherein a parison 563 is injection molded. Core 561, mold 555 are provided with passageways 565 to apply fluid pressure to aid processing of the tumbler noted in the '543 patent. After injection molding, parison 563 is retained on core 40 and moved to blow mold 557. Parison 563 is of predetermined volume and has at its upper periphery a fortified rim 516 in accordance with the invention. The parison is expanded to the desired shape in blow mold 557 to a volume of from about 1.5 to about 4 times its former volume on core 561. This process imparts biaxial orientation to the article, reducing the anisotropy inherent in the injection molding process and proving biaxial toughness to the article.

Figure 6A:
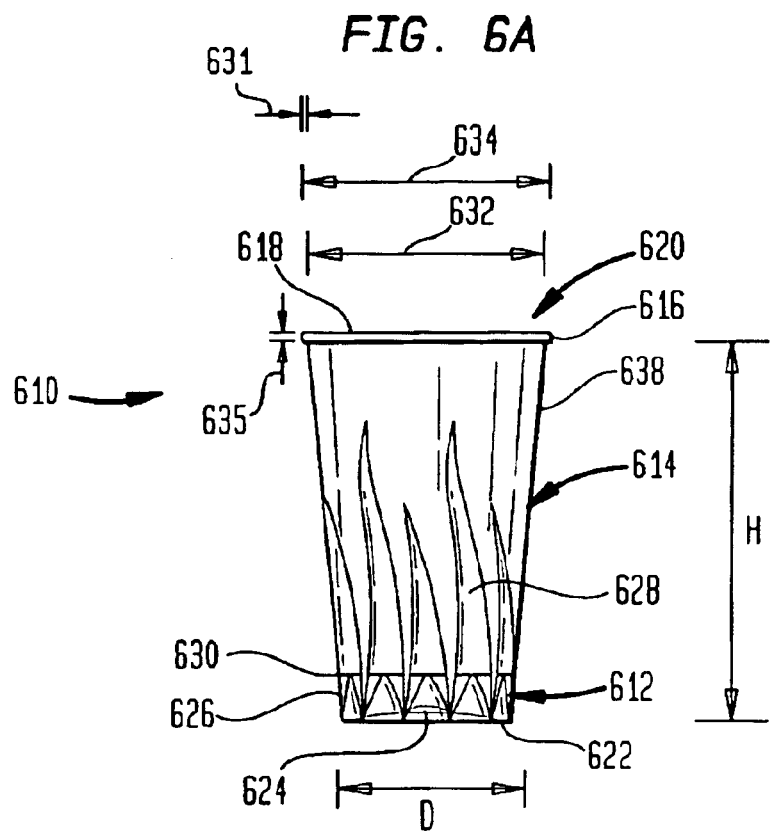
FIG. 6(a) is a view in elevation of a tumbler constructed in accordance with the present invention.
Figure 6B:
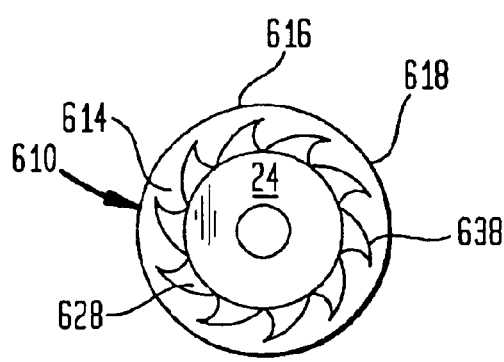
FIG. 6(b) is a plan view of the bottom of the tumbler of FIG. 6(a)
Figure 6C:
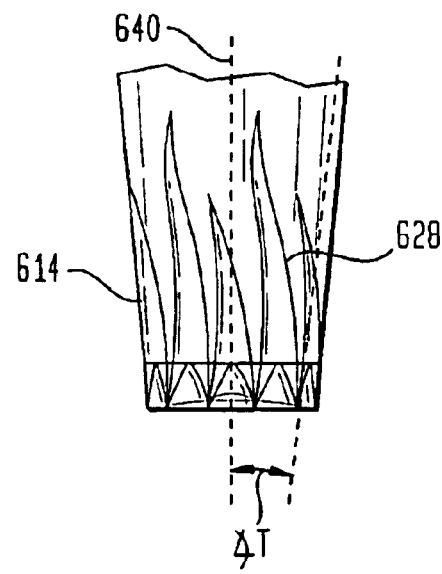
FIG. 6(c) is a partial view in elevation of the tumbler of FIG. 6(a) showing the grip design in greater detail.

There is shown in FIGS. 6(a) through 6(c) a tumbler 610 constructed in accordance with the present invention. In general tumbler 610 has a base portion 612, a sidewall portion 614 and an upper circular rim portion 616 which extends about the periphery 618 of an opening 620 of tumbler 610. Base portion 612 of tumbler 610 is integrally formed with the rest of the tumbler and includes a bottom 622 which has a meniscus portion 624 and a base sidewall 626. Base sidewall 626 is typically thicker than sidewall 614, and has either no taper, or a reverse taper from the taper of sidewall 614.

Tumbler 610 is optionally provided with a molded-in design 628 which is more clearly seen by reference to FIGS. 6(b) and 6(c). Molded in designs may define ridges which are deeper in dimension than the wall caliper of sidewall 614, thus providing strength by way of corrugation, much like as is known in connection with cardboard. The design shown is an alternating saw-tooth type, slightly curved, with larger curves alternating with smaller curves about the entire periphery of the tumbler. The design is also operative as a grip for a user since the smooth sidewall is substantially altered.

Base sidewall 626 extends upwardly to define an outer edge 630 which attached to sidewall 614. Sidewall 614 extends upwardly to fortified rim 616. Rim 616 is integrally formed with sidewall 614 and is a continuous generally circular or oval, solid polymer bead extending about periphery 618 of opening 620. Rim 616 has a width indicated at 631 which is defined by the difference between an inner diameter 632 and an outer diameter 634 of rim 616 and a height shown at 635 which is the distance over which the width indicated at 631 extends. The width 631 is thicker than adjacent sidewall portion 638 which is typically of the same caliper as the rest of sidewall 614, that is, sidewall 614 is substantially uniform in thickness on the entire tumbler. In the example shown, adjacent sidewall portion 638 has a thickness of 20 mils, height 635 is approximately 28 mils and width 631 of rim 616 is approximately 40 mils at its thickest point.

The other dimensions of tumbler 610 are indicated on FIGS. 6(a) through 6(c). Base portion 612 has a diameter, dl, at edge 630 of about 2.125 inches, an outer upper diameter 34 of 3.32 inches and an inner upper diameter 632 of 3.279 inches. The overall height, H of tumbler 10 is 4.75 inches. These dimensions, as can be seen from FIG. 6(c), define an angle of taper T as shown about imaginary central axis 40 of about 7° for sidewall 614 of tumbler 610. As used herein, "taper", "degree of taper", or like terminology indicates the angle that the sidewall of the inventive tumbler makes with the imaginary central longitudinal axis defined by the sidewall which is substantially cylindrical or conical depending upon the embodiment. Inasmuch as the sidewall is substantially perpendicular to bottom 622, the taper may also be thought of as of the angle the sidewall makes with the bottom less 90 degrees.

FIG. 6(c) shows a molded in "sawtooth" swirl design 628 which extends from base portion 612 to roughly 65 percent of the height of tumbler 610. Design 628 is comprised of wall embossments at least as prominent as ½ the caliper of sidewall 614. Typically the molded in ridges of the design are about as deep as the wall caliper. Thus, design 628 substantially alters the topography of sidewall 614 and provides a secure grip for a user.

Figure 7A:
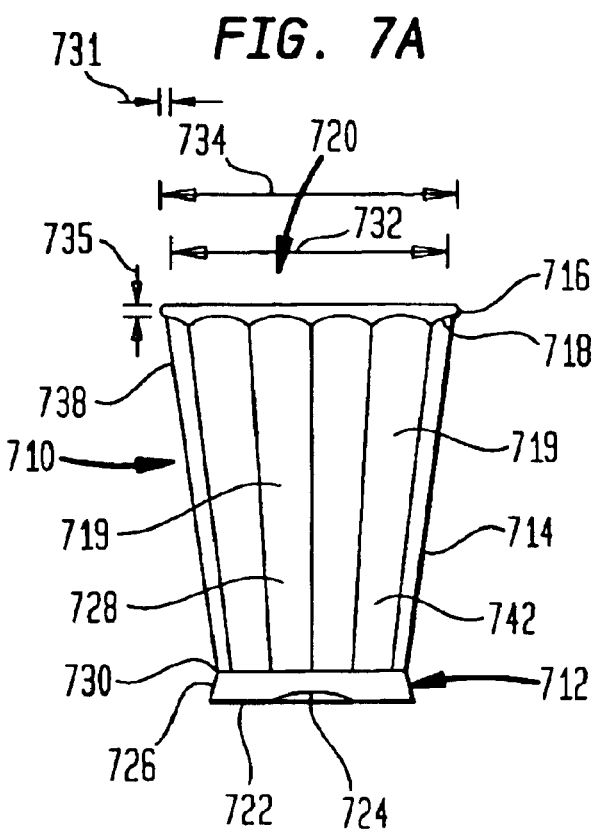
FIG. 7(a) is a view in elevation of an alternate embodiment of a tumbler constructed in accordance with the present invention with a fluted design.
Figure 7B:
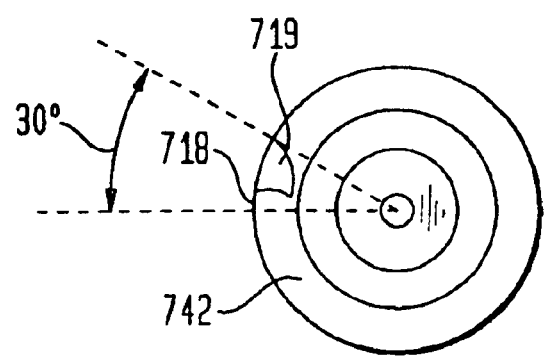
FIG. 7(b) is a plan view of the bottom of the tumbler of FIG. 7(a) showing 1 fluted surface.

There is shown in FIGS. 7(a) through 7(c) another tumbler 710 constructed in accordance with the present invention. Tumbler 710 has a base portion 712, a sidewall portion 714 and an upper circular rim portion 716 which extends about the periphery 718 of an opening 720 of tumbler 710. Base portion 712 of tumbler 710 is integrally formed with the rest of the tumbler and includes a bottom 722 which has a meniscus portion 724 and a base sidewall 726. Base sidewall 726 is typically thicker than sidewall 714, and has a reverse taper from the taper of sidewall 714, as can be seen from FIG. 7(a).

Tumbler 710 is optionally provided with a fluted molded-in design 728 which is seen by reference to FIG. 7(b). Each flute 719 is substantially a flat, rectangular shape and approximately 30 degrees about the periphery 242 of the glass. Molded-in design 728 provides strength as is known in connection with injection molded drinking vessels. Base sidewall 726 extends upwardly to define an outer edge 730 which attaches to sidewall 714. Sidewall 714 extends upwardly to fortified rim 716.

Rim 716 is integrally formed with sidewall 714 and is a continuous generally circular or oval, solid polymer bead extending about periphery 718 of opening 720. Rim 716 has a width indicated at 731 which is defined by the difference between an inner diameter 732 and an outer diameter 734 of rim 716 and a height shown at 735 which is the distance over which the width indicated at 731 extends. The width indicated at 731 is thicker than adjacent sidewall portion 738 which is typically of the same caliper as the rest of sidewall 714. In the example shown, adjacent sidewall portion 738 has a thickness of 20 mils, height 736 is approximately 28 mils and width 731 is approximately 40 mils at its thickest point.

Other dimensions of tumbler 710 are generally as indicated in connection with tumbler 610 of FIG. 6. Sidewall 714 of tumbler 710 has a taper of approximately 6.5 degrees.

The tumblers of FIGS. 6 and 7 have the fortified rim design of the present invention wherein the rim includes a spherical or elliptical solid polymer bead. Typically, this bead is twice the thickness of the adjacent sidewall or more as was discussed in connection with FIGS. 4(a) and 4(b) above. That discussion applies equally to the embodiments of FIGS. 6, 7, 8 and 17 as will be appreciated from the foregoing and subsequent discussion.

Figure 8:
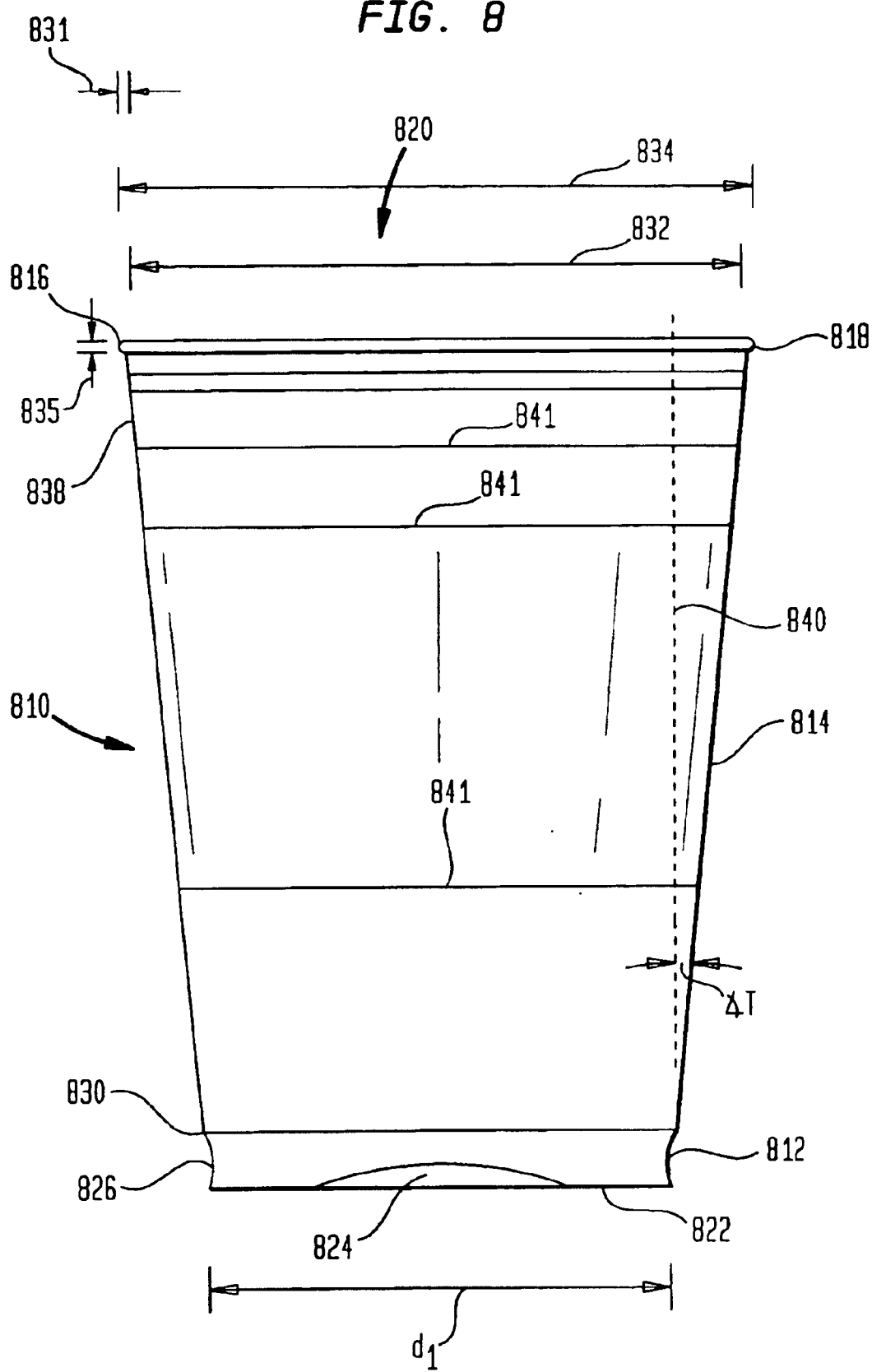
FIG. 8 is a view in elevation of still yet another tumbler constructed in accordance with the present invention.
Figure 12:
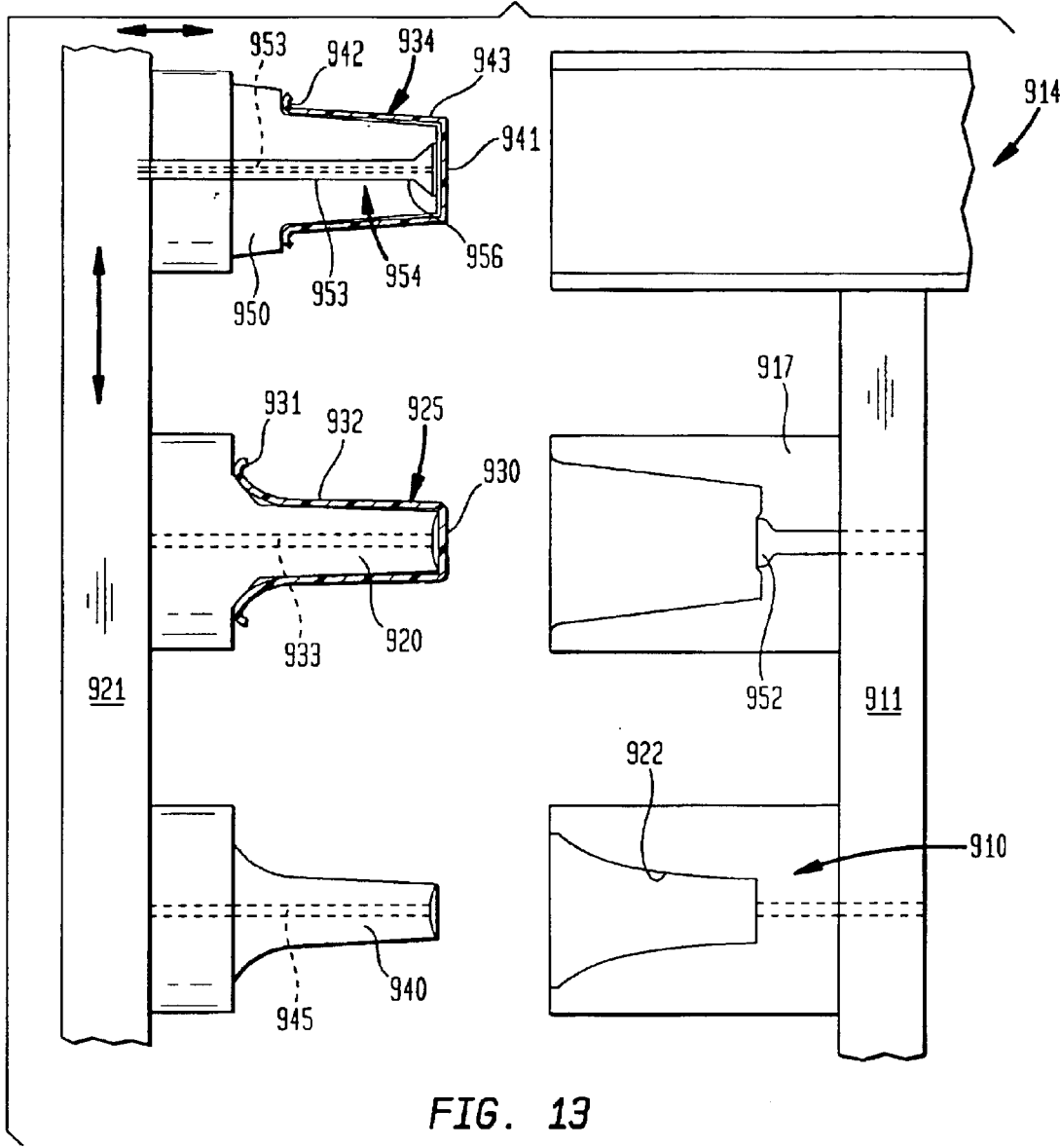
FIG. 12 is a partial, expanded elevational view showing additional details.

Salient features of the inventive tumblers include the biaxial-induced toughness of the blow-molded article, as well as rigidity achieved by combining a relatively low taper with a fortified upper rim. Conventional blow-molded cups typically include a very prominent curled lip which is not consistent with glassware and tends to make the article unappealing for everyday use or for use with guests. Moreover, the rim is larger than a comparable rim on tumblers of the invention such that there is more rim stress upon flexing, especially in connection with larger volume tumblers as will be appreciated from the following:

There is shown in FIG. 8 a tumbler 810 which is constructed in accordance with the present invention. In general, tumbler 810 is cylindrical or in the shape of a truncated cone and has a base portion 812, a sidewall portion 814 and an upper circular rim portion 816 which extends about the periphery 818 of an opening 820 of tumbler 810. Base portion 812 of tumbler 810 is integrally formed with the rest of the tumbler and includes a bottom 822 which has a meniscus portion 824 and a base sidewall 826. Base sidewall 826 is typically thicker than sidewall 814, and has either no taper, or reverse taper from the taper of sidewall 814.

Base sidewall 826 extends upwardly to define an outer edge 830 which attaches to sidewall 814. Sidewall 814 extends upwardly to fortified rim 816. Rim 816 is integrally formed with sidewall 814 and is a continuous generally circular or oval, solid polymer bead extending about periphery 818 of opening 820. Rim 816 has a width indicated at 831 which is defined by the difference between an inner diameter 832 and an outer diameter 834 of rim 816 and a height shown at 835 which is the distance over which the width indicated at 831 extends. The width at 831 is thicker than adjacent sidewall portion 838 which is typically of the same caliper as the rest of sidewall 814, that is, sidewall 814 is substantially uniform in thickness on the entire tumbler. In the example shown, adjacent sidewall portion 838 has a thickness of 20 mils, the height at 835 is approximately 28 mils and the width at 831 of rim 816 is approximately 40 mils at its thickest point. The tumbler is also provided with a series of molded-in grooves 841 which extend around the tumbler. These grooves provide a grip for users as well as providing rigidity to the article.

Other dimensions of tumbler 810 are indicated on FIG. 8 and Table 1 in connection with the tumbler of FIG. 8(b) as shown schematically in FIG. 4(b). Base portion 812 has a diameter dl, at edge 830 of about 2.5 inches, an outer upper diameter 834 of 3.38 inches and an inner upper diameter 832 of 3.32 inches. The overall height, H of tumbler 810 is about 4.6 inches. These dimensions define an angle of taper T as shown about imaginary axis 840 of about 5° for sidewall 814 of tumbler 810. As used herein, "taper", "degree of taper" or like terminology indicates the angle that the sidewall of the inventive tumbler makes with the longitudinal axis defined by the sidewall which is substantially cylindrical or conical depending upon the embodiment. Inasmuch as the sidewall is substantially perpendicular to bottom 822, the taper may also be though of as of the angle the sidewall makes with the bottom less 90 degrees, because the axis of the tumbler is substantially perpendicular to bottom 822 as shown.

Referring again to FIG. 4(a), there is schematically depicted a lip curl characteristic of prior art disposable drinking cups. In general, such prior art cups have a sidewall 414a with a portion 438a adjacent the curl of a given thickness $D_{2a}$ which extends upwardly into a curl generally indicated at $450_a$. The curl has a characteristic radius $R_a$ as well as a height $H_a$ and a width $W_a$. Such structures are sometimes called "open top curls" and may be seen, for example, in U.S. Pat. No. 4,540,543. See FIG. 4 thereof at 31. FIG. 4(b) schematically depicts in section and elevation a solid polymer bead 416 about the upper periphery of a tumbler, that is, an embodiment of the fortified rim of the present invention as is also shown in FIG. 8 hereof which extends around the upper periphery of the inventive tumbler. The tumbler has a sidewall 414b with a portion adjacent rim 416b of thickness $D_{2b}$, the fortified rim, 416b is formed of solid polymer integrally formed with sidewall 414b and has a height $H_b$ and width $W_b$ as indicated. Inasmuch as the cross section of the embodiment shown is circular, the width $W_a$ is approximately equal to the height $H_b$. Bead 416b has advantages over the prior art top curl. For one, it is rounded and will not tend to snag on the mold or snag with a cup cover as do prior art top-curls. For another advantage, a bead type top rim can more compactly provide rigidity to a cup than does a top curl, with less width as demonstrated below in Table 1, even for a relatively large volume container such as that shown in FIG. 8.

TABLE 1

Impact of Dimensions Upon Rigidity

| Container | Cup of FIG. 4(a) Open Rim | Tumbler of FIG. 4(b) and FIG. 8 Solid Rim |
|---|---|---|
| Sidewall Caliper, Inches | 0.0150 | 0.0150 |
| Top Curl Caliper, Inches | 0.0150 | 0.0628 |

TABLE 1-continued

Impact of Dimensions Upon Rigidity

| Container | Cup of FIG. 4(a) Open Rim | Tumbler of FIG. 4(b) and FIG. 8 Solid Rim |
|---|---|---|
| Top Curl/Sidewall Caliper Ratio | 1.00 | 4.19 |
| Top Curl Width, Inches | 0.084 | 0.063 |
| Taper, Degrees | 5.0 | 5.0 |
| Inside height, Inches | 4.584 | 4.584 |
| Upper Inside diameter, Inches | 3.3250 | 3.3250 |
| Lower Inside diameter, Inches | 2.5200 | 2.5200 |
| Volume, Ounces | 17.1448 | 17.1448 |
| Rigidity, LBS/0.25" Deflection | 1.045 | 1.045 |

Being more compact, less hoop stress about the rim is generated upon flexing of the cup. While polymer bead 416*b* is shown as circular in cross-section, other profiles may be suitable for example, conic sections such as ellipsoid shapes or truncated conic sections or profiles such as truncated conic section including a semi-circle or a half ellipse. As noted above, tumblers in accordance with the present invention are produced by injection blow-molding optically transparent polymers. Particularly preferred polymers include crystal polystyrene available from Dow Corporation, Midland, Mich., with the grade designation 685D. This polymer may be used to produce the inventive tumblers by the method of U.S. Pat. No. 4,540,543, the disclosure of which is incorporated herein by reference. The subject apparatus and method is shown and described in more detail in connection with the embodiments of the present invention which follow.

The present invention is directed in still yet further embodiments to a reusable polycarbonate container or tumbler and method of making the polycarbonate container. The reusable or permaware polycarbonate container of the present invention is made by an injection blow-molding process to provide a polycarbonate container which mimics the aesthetic clarity of glass and polystyrene containers but is more durable than either glass or polystyrene containers of comparable caliper and shape. The permaware polycarbonate containers or tumblers include a base, a sidewall and a fortified upper rim. The sidewall is integrally formed with the base and extends upwardly from the outer edge thereof. The sidewall is of uniform caliper or thickness of greater than about 50 thousandths of an inch ("mils") to about 500 thousandths of an inch. Preferably, the caliper of the sidewall ranges from about 75 mils to about 375 mils. While the tumbler in accordance with the invention is generally cylindrical in overall shape, the sidewall preferably has either a uniform or non-uniform taper from an imaginary central axis from the base to the opening. The height of the tumbler is from about 5 to 10 inches. At the upper extremity of the sidewall is a fortified rim which serves to impart rigidity to the tumbler. The fortified rim area has a finite width and height both of which exceed the thickness of the adjacent sidewall. The rim is at least 2 mils thicker than the adjacent sidewall over a height of at least 2 mils; preferably, both the width and the height of the rim are from about 1.1 to about 4 times the thickness of the adjacent sidewall. The base ranges from about 1.1 to about 8 times, preferably, from about 1.1 to about 4 times the thickness of the sidewall. Generally speaking, the tumbler in accordance with the invention, has a volume of at least 1.5 and up to 4 times the volume of the injection molded parison from which it was prepared; while volume ratios (sometimes referred to as "blow ratio") of from about 1.75 to about 3 are typical. A blow ratio of about 2 to about 2.5 is most preferable. Articles in accordance with the present invention are distinguished from other containers, such as bowls or other flat shapes where rigidity is not critical, by virtue of the fact that the ratio of the height of the tumbler to the diameter of the upper opening is generally in the range of from about 1 to about 5. Ratios of 1.25 to about 4 are preferred, while ratios of about 1.5 to about 3.5 are more preferred.

An example of a polycarbonate container in accordance with the present invention is a "bell fountain" container illustrated in FIGS. 17(*a*)–(c) and is described in detail below. The reusable polycarbonate containers are preferably prepared by the rapidly and economically efficient side-by-side injection blow-molding process as disclosed in aforementioned U.S. Pat. No. 4,540,543. The process is described below in combination with the drawings of FIGS. 9–19. U.S. Pat. No. 4,540,543 is herein incorporated by reference in its entirety. Referring to FIGS. 9–11, injection station 910 is secured in fixed platen 911. Blow stations 912 and 913 are also secured to fixed platen 911 and are situated adjacent injection station 910 and in side-by-side relationship with respect thereto, with blow station 912 containing blow mold 916 which may be split if desired being on one side of the injection station and blow station 913 containing blow mold 917 which may be split if desired being on the other side. Blow molds 916 and 917 are in the shape of the hollow articles to be made. Ejection stations 914 and 915 are also secured to fixed platen 911 and are situated adjacent the respective blow stations in side-by-side relationship with respect thereto, with ejection station 914 situated adjacent blow station 913 and ejection station 915 situated adjacent blow station 912. Core 920 is provided secured to movable platen 921 engageable with injection station 910 as shown in FIG. 9. The injection station 910 includes mold wall 922. Thus, when core 920 is engaged with injection station 910 as shown in FIG. 9 the core 920 is spaced from the mold wall 922 to form mold cavity 923 therebetween. Injection means 924 is in communication with mold cavity 923 and is connected to a source of hot flowable plastic, i.e., polycarbonate, (not shown) for forcing said hot formable plastic under pressure into mold cavity 923 to form parison 925. Core 920 is movable into and out of engagement with injection station 910 by movable platen 921 actuated by the motive means shown schematically in FIG. 9 and to be described in more detail herein below. Naturally, the movement of platen 921 may be accomplished by conventional means, shown only schematically in FIG. 9, which are capable of providing a clamping force between the two platens to keep them from separating during the injection step and the other steps which will be described below. It should be understood that while movement of platen 921 is described, one may of course move platen 911 or both platens 911 and 921, if desired. The hot, newly formed parison or container 925 remains in mold cavity 923 until sufficiently cooled to be removed, if desired using cooling means 926 adjacent mold wall 922, as for example, by fluid circulation. If desired, such cooling means may also be provided in core 920. After such cooling of parison 925, the clamping force is released and platen 21 is moved away from platen 11 carrying with it core 920 and parison 925 adhered thereto. If a neck mold is used as to form a threaded neck portion the neck mold is operable by conventional means and remains closed during the formation of the parison, removal of the parison from the injection station and blowing, which also aids in retention of the parison on the core. In the present embodiment, a neck mold is not employed and both the parison and final article have a cup-shaped configuration as seen in the drawings and clearly shown in FIG. 13 and FIG. 17. In such configuration, the top or mouth of the container (mold) is about as wide or wider than the diameter of the remainder of the container mold. Thus, parison 925 has a base portion 930, a fortified rim or lip 931 and outwardly flaring side walls 932 extending from base 930 to lip 931. Fortified rim 931 may serve as an undercut to aid in retention of the parison on the core. Core 920 is provided with fluid passageway 933 connected to a source of fluid pressure for blowing the final article. If desired, a vacuum may be drawn through passageway 933 to aid in retention of the parison on the core. Core 920 with parison 925 thereon is then moved to blow station 913 as shown in FIGS. 10 and 11 in a manner which first separates the parison from the mold wall 922 by moving parison core 920 axially in a straight path away from said mold wall at least until the parison clears the injection station, followed by movement in a substantially arcuate path into axial alignment with blow station 913 and blow mold 917, followed by moving the parison core axially in a straight path into blow mold 917. Parison 925 is then expanded on core 920 in blow mold 917 by fluid pressure through passageway 933 to form hollow article 934. FIG. 9 shows core 920 engaged with the injection station. FIG. 10 shows core 920 with parison 925 thereon removed from the injection station on its arcuate path between injection station 910 and blow station 913 with platen 921 and core 920 at the peak of their arcuate path. FIG. 11 shows core 920 engaged with blow station 913 forming hollow article 935 therein. After the formation of hollow article 934, core 920 is removed from blow station 913 leaving hollow article 934 remaining therein and returned to the injection station along paths corresponding to the path taken by core 920 from the injection station 910 to the blow mold 917, that is, the core is moved axially in a straight path away from blow mold 917 followed by movement in a substantially arcuate path into axial alignment with said injection station, followed by movement axially in a straight path into said injection station for repeat of the cycle.

Second core 940 having fluid passageway 945 similar to passageway 933 is provided on movable platen 921 adjacent core 920 in side-by-side relationship with respect thereto. Second core 940 is engageable with injection station 910 when core 920 engages blow mold 917 to form a second parison in an overlapping cycle with respect to core 920. Thus, second core 940 engages injection station 910 to form a parison 925 in a manner similar to the formation of a parison on core 920 in the injection station 910. The formation of a parison on core 940 takes place while core 920 is in the blow mold 917 forming the hollow article. Core 940 carrying a parison 925 is then removed from the injection station and transferred to blow station 912 and blow mold 916 in a path corresponding to the transfer path of core 910 to blow station 913 and blow mold 917 for formation of additional hollow article 934 in blow mold 917. The transfer of core 940 to blow mold 917 takes place simultaneously with the return of core 920 to injection station 910. After removal of core 920 from blow station 913 hollow article 934 remains in blow mold 917. Hollow article 934 corresponds in shape generally to parison 925 with an expanded configuration caused by the blowing step. Thus, article 934 has a base portion 941, fortified rims or lips 942 and outwardly flaring side walls 943 extending from base 941 to lips 942. The blown article 934 cools in contact with the walls of the blow mold which may contain cooling means 944, as for example for cooling by fluid circulation in a conventional manner. Article 934 may be retained in the blow mold by any desired means as by applying a vacuum to the inside of the blow mold or providing means on the blow mold to engage lip 942.

Figure 13:
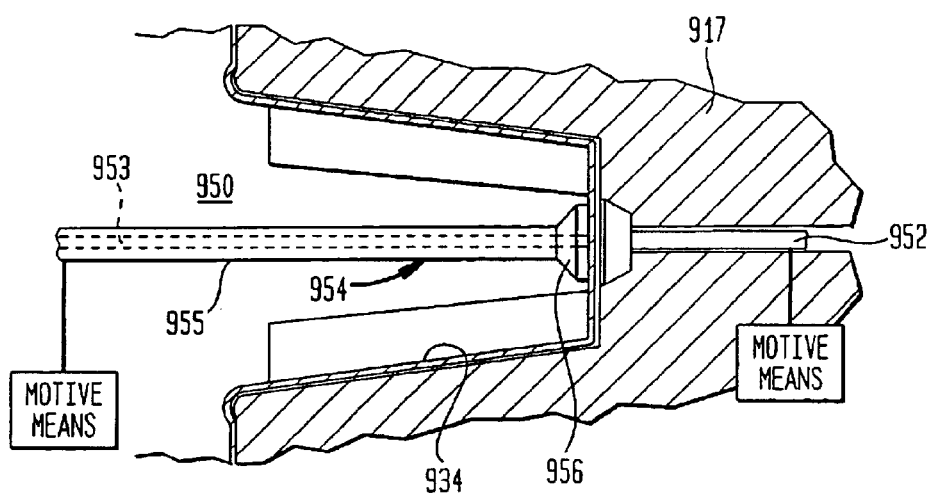
FIG. 13 is a detailed view of the ejection core engaged with the hollow article in the blow mold.

Ejection core 950 and second ejection core 951 are provided on movable platen 921 adjacent and in side-by-side relationship to cores 940 and 920, with ejection core 951 alongside second core 940. Thus, when cores 920 and 940 leave their respective blow molds 917 and 916 with the hollow articles remaining therein for return to the injection station, ejection cores 950 and 951 move into engagement with said hollow articles in the blow molds along paths corresponding to the paths of cores 920 and 940. Cores 950 and 951 then disengage from the blow molds removing hollow articles 934 with them and move from the blow stations to the ejection stations along paths corresponding to the paths of cores 920 and 940. Removal of hollow article 934 onto the ejection cores may be assisted by pusher means 952 operatively associated with blow molds 916 and 917 for positively pushing article 934 away from the blow molds, see FIGS. 12 and 13. Also, ejection cores 950 and 951 may be provided with fluid passageways 953 connected to a source of fluid pressure (not shown), see FIG. 13, which may be used to draw a vacuum and aid in removal of hollow article 934 from the respective blow molds. The final hollow article is then transferred to the respective ejection station, which may incorporate any suitable ejection means as the chute, suction tube or other conventional means to convey plastic articles. Removal of article 934 from the ejection cores 950 and 951 at ejection stations 914 and 915 may be assisted by flow pressure from passageway 953 and also by stripper 954 including stem 955 to which a widened cap 956 is attached (FIGS. 12 and 13) movable axially via motive means (not shown). After removal of the hollow article 934 at the ejection stations the cycle is repeated. The apparatus, particularly for use with cup-shaped articles, assures holding of the articles concentrically on the mandrels and effecting reliable transfer as shown in FIG. 13.

In operation, the parison is transferred into blow mold 917 as above described and blown into final shape therein, followed by insertion of mandrel 950 which is shorter than the depth of the blow mold. In order to remove the blown article 934, pusher plate 952 is advanced forcing the blown object onto mandrel 950 which is then withdrawn. If desired, vacuum may be applied through passage 953 better to assure adherence of article 934 to the mandrel during withdrawal from the blow mold. Clearly, pusher plate 952 and the stripper cap 956 may also be used to shape the portion of article 934 between them. If a rim undercut is embedded in the blow mold, it is overcome to effect release from the blow mold by the action of pusher plate 952 which has a stroke at least sufficient for the length of said undercut, it being understood that a given article may exhibit more than one undercut. In this manner, sticking of the finished article to the blow mold is avoided. Subsequently, mandrel 950 carrying article 934 is aligned with removal devices as described above and, since all relative movement between the mandrel and the blow mold may be precluded due to the close fit of the mandrel and the article at the neck of the article, which may be an interference fit or an undercut, and, if necessary due to the vacuum, the alignment will be consistent from cycle to cycle. Upon alignment with the ejection station, the vacuum if theretofore applied through channel 953 is released and stripper 954 is actuated to urge the article into engagement with the ejecting device by positive mechanical means. The advantage of this arrangement compared to previous practice is in its reliability, preventing interruptions of the operation and thereby improving efficiency. While the foregoing description shows a single injection mold and core set, it will naturally be understood that multiple injection mold and core sets may readily be employed, for example, arranged side-by-side or in several rows. Thus, it can be seen that the process and apparatus of U.S. Pat. No. 4,540,543 obtains significant advantages. The overlapping cycles enable plural operations to be conducted simultaneously. While core 920 is engaging injection station 910 to form a first parison, second core 940 is engaging blow mold 916 to form a final article 934, second ejection core 951 is ejecting a hollow article at ejection station 915 and ejection core 950 is engaging a hollow article at blow station 913 for removal thereof, with the axial, arcuate and axial movement described hereinabove providing a considerable advantage in reduction in cycle time which of course is a prime consideration in this art. The so-called "dry cycle" is that part of the total operating cycle of the apparatus described in FIGS. 9–11 which is not attributable to process related factors but only to the mechanism.

The total cycle divides into the dry cycle and the process cycle. In an injection blow-molding operation the pressure molding of the parison typically takes longer than the finishing thereof by blowing or the removal of the blown article. These three steps overlap so that while one parison is being molded another is being blown and still another is being removed after having been blown. Accordingly, the longest of these three steps determines the overall process cycle. Considering the injection molding step by itself it is found that the process of pressure molding and cooling the parison sufficiently to be removable from the injection mold takes about one (1) second for a polycarbonate cup referred to above, while the dry cycle of the injection mold clamping apparatus is apt to take nearly four (4) seconds in a conventional device. The dry cycle as such, being the greatest part of the total cycle, could not therefore be reduced because of the time consuming movement of the core assembly away from the injection mold, sideways into alignment with the blow mold and towards the blow mold, including the reverse of same. This is true of prior linear and rotary systems.

Figure 14:
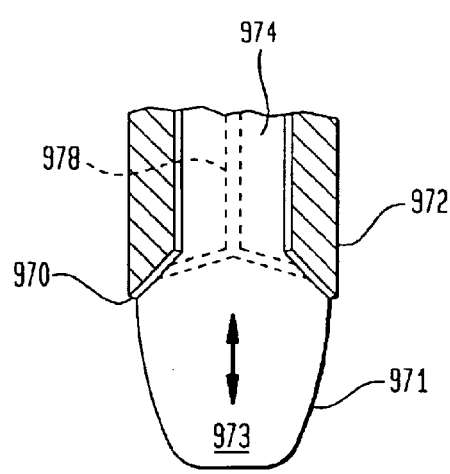
FIGS. 14 and 15 are partial views showing alternate core embodiments.
Figure 15:
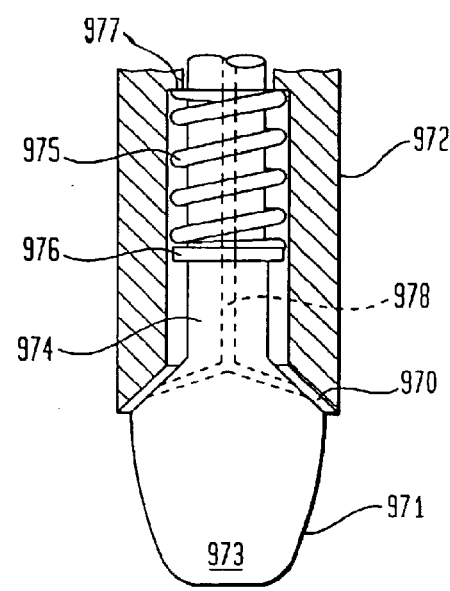
Figure 16:
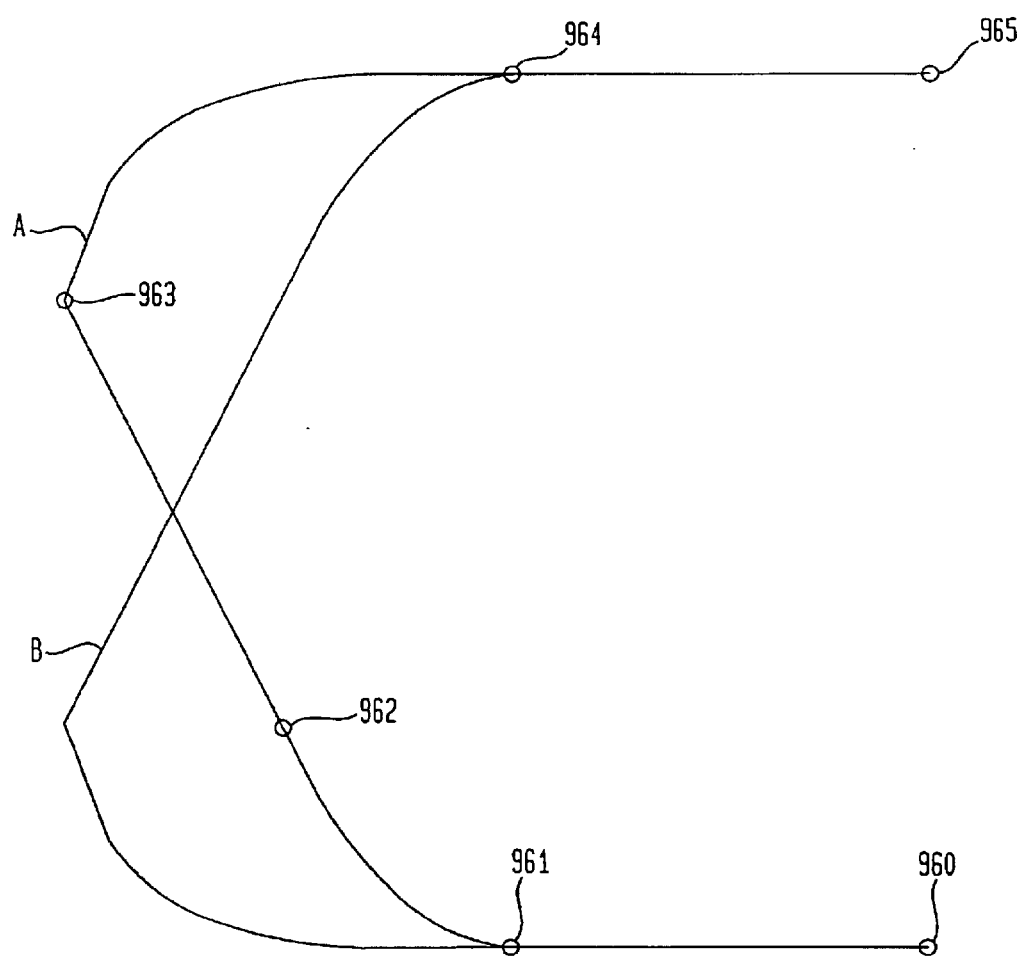
FIG. 16 is a line chart showing core movement from injection is mold to blow mold and return.

In accordance with the present invention, however, the axial, arcuate and axial movement substantially reduces the dry cycle time and thus reduces the overall cycle time. Referring to FIG. 16, the movements of movable platen 921 are shown diagrammatically, which will of necessity include the movement of the cores thereon. Thus, when platen 921 moves from the position in FIG. 9 to the position in FIG. 11 a given point on the platen will follow curve A. The return movement will follow curve B. As platen 921 moves away from platen 911 the section on curve A from location 960 to 961 represents movement from the closed position of FIG. 9 to that point at which movement of core 920 with parison 925 thereon may occur laterally without mechanical interference. As soon as location 961 is passed said point starts its lateral movement which is subdivided into three (3) sections, namely between locations 961 and 962 in which acceleration is taking place, then between 962 and 963 in which the velocity of the point is constant, followed by between 963 and 964 in which deceleration is taking place. Finally, locations 964 and 965 show the approach to the blow mold and the position shown in FIG. 16. Naturally, the actual shapes of the curve segments will depend on the mass being moved, with the segment being steeper the lighter the movement assembly. As indicated above, curve B depicts the reverse movement. These movements can be effected by any conventional means, e.g. fluid actuators or by cam action. If by fluid actuators, it is readily possible to initiate their movement and thus also that of platen 921 by a limit switch placed to be tripped by platen 921 as soon as said platen reaches the distance from platen 911 at which the lateral movement of core 920 can take place unimpeded. If by cam action, fixed cams in the shape of curves A and B of FIG. 16 may be used and platen 911 may be equipped with corresponding cam followers, to the effect that the axial movement of platen 921 will at the same time induce its lateral movement according to the cam path. Other means to produce the same result may be employed so long as the lateral movement of platen 921 is effectively controlled by its axial movement, whereby said lateral movement accommodates acceleration and deceleration of platen 921 according to the mass to be moved therewith. The advantage of this improved arrangement is evident from the gain in cycle time. Thus, in the case referred to hereinabove the dry cycle of the injection clamping apparatus is reduced from approximately 4 seconds to approximately 1.2 seconds, of which the lateral shifting of platen 921 takes only 0.4 to 0.5 seconds including acceleration and deceleration. This improvement is particularly noticeable in connection with mechanical, e.g. toggle or crank clamping mechanisms which are favored for rapid acting injection clamps over fluid actuated clamps. In the former, the clamping apparatus, which is of the "fixed stroke" type can be used to induce the movement of platen 21 during that portion of its opening and closing stroke respectively which is in excess of the minimum clearance between core 920 and mold 917. Cores 920 and 940 are equipped with fluid passageways terminating in so-called blow slots 970 as shown in FIG. 14 in order to effect blowing of the preforms in the blow molds, as is known in the art. If permanently open, the blow slot 970 is connected according to conventional design of a source of pressure fluid and a source of vacuum via fluid passageway 978 whereby the change from one to the other is effected by a conventional valve in order for the dual function of the blow slot to be readily accomplished as needed during injection and opening of the injection mold, and then during blowing. The blow slot may be formed of two elements of the core, for example leading element 971 and following element 972, that are capable of relative movement as shown in FIG. 14 by the arrow, with FIG. 11 showing leading element being relatively moveable, with element 971 having a leading bulb-like portion 973 connected to a movable stem 974 which in turn is connected to a motive means (not shown). It is necessary to control the opening and closing of blow slot 970 mechanically in the following sequence: the blow slot is closed and held in that condition while injection of the plastic into the mold is initiated and almost immediately thereafter is opened; alternatively, it may be kept closed until the filling of the mold is accomplished and opened only thereafter. Vacuum is applied while the blow slot is open and maintained as core 920 or 940 is moved away from injection station 910 (see FIGS. 9 and 10). The blow slot remains open and vacuum is maintained while the preform moves from the injection station into the blow station, at which time, by suitable valving, the vacuum is broken and fluid pressure applied inside the preform to expand it into the shape of the finished article. At the end of the blowing cycle, the connection between the blow slot and the source of fluid pressure is interrupted, but vacuum is not admitted inside the finished article. Accordingly, in the case of an operable slot, the flow of fluid or connection to vacuum is controlled by a valve system that operates as follows: open to vacuum; closed to vacuum, open to pressureclosed to pressure, open to atmosphereclosed to pressure, closed to vacuum; blow slot closed FIG. 15 shows one embodiment of actuating the blow slot 970. As shown, a spring 975 is provided, urging the movable element 971 forming the blow slot to open the latter. Stem 974 is provided with a fixed annular bar 976. Spring 975 is affixed to stem 974 between bar 976 and internal ridge 977 on element 972. When inserted into the injection station, the entering plastic will tend to counteract the force of spring 975 closing the blow slot. When the pressure of the entering plastic is relieved, spring 975 will tend to open the slot again. However, if no vacuum is applied, then atmospheric pressure will tend to close the slot or counteract the spring. Accordingly, the spring force chosen has to be such as to maintain the blow slot open against the atmospheric pressure so that vacuum may be applied.

The total force due to atmosphere pressure counteracting the spring is of course one atmosphere times the maximum projected area of the movable portion of the core assembly; $A^2 \pi/4$. Accordingly, the force of the spring will be chosen well above that figure, for example, twice or three times that much, it being noted that the pressure of the plastic during injection is many times higher so that even with a stronger spring the blow slot will still be closed during the injection step. Thus, the cores may be provided with means operative to close the blow slot under the pressure of incoming plastic and to open the blow slot when the pressure of the incoming plastic is relieved. If the blow slot is to be permanently open, it must of course be held to a dimension precluding clogging thereof by penetration of the plastic while under pressure. That dimension is accordingly chosen according to the viscosity of the plastic at pressure molding temperature. In the case of very thin fluid plastics, e.g. relatively low molecular weight polyethylene and nylon, it is not possible to produce a narrow enough slot and to maintain it economically. In the case of most amorphous plastics such as polystyrene, a permanently open slot may be used. As an improvement, the faces of the corresponding blow core components forming the slot are slightly tapered toward the outside as shown in FIGS. 14 and 15, i.e., the side facing away from the core, and they are preferably coated with a substance that prevents adhesion of the entering plastic to metal surfaces, e.g. teflon. In consequence, any slight amount of penetration into the slot will be cured during the blowing step, at which time the plastic that will thus have entered the blow slot will be blown out. The above described apparatus features interact with the process, particularly because a critical relationship exists between the temperature of the plastic at any given stage and the rate and magnitude of the forming operation to which it is subjected. The process injection blow-molding is of course aimed at providing a predetermined shape of the finished article. In addition, in most instances, as when converting brittle plastics into thin-walled objects the process is used to improve the properties of the plastic, such as strength, ductility, resistance to permeation, etc. by molecular orientation, the details of which are well known, including the fact that the best levels of orientation are obtained by conducting the forming process at the lowest temperature compatible with the glass transition range of the given plastic that the chosen procedure is capable of.

Figure 17A:
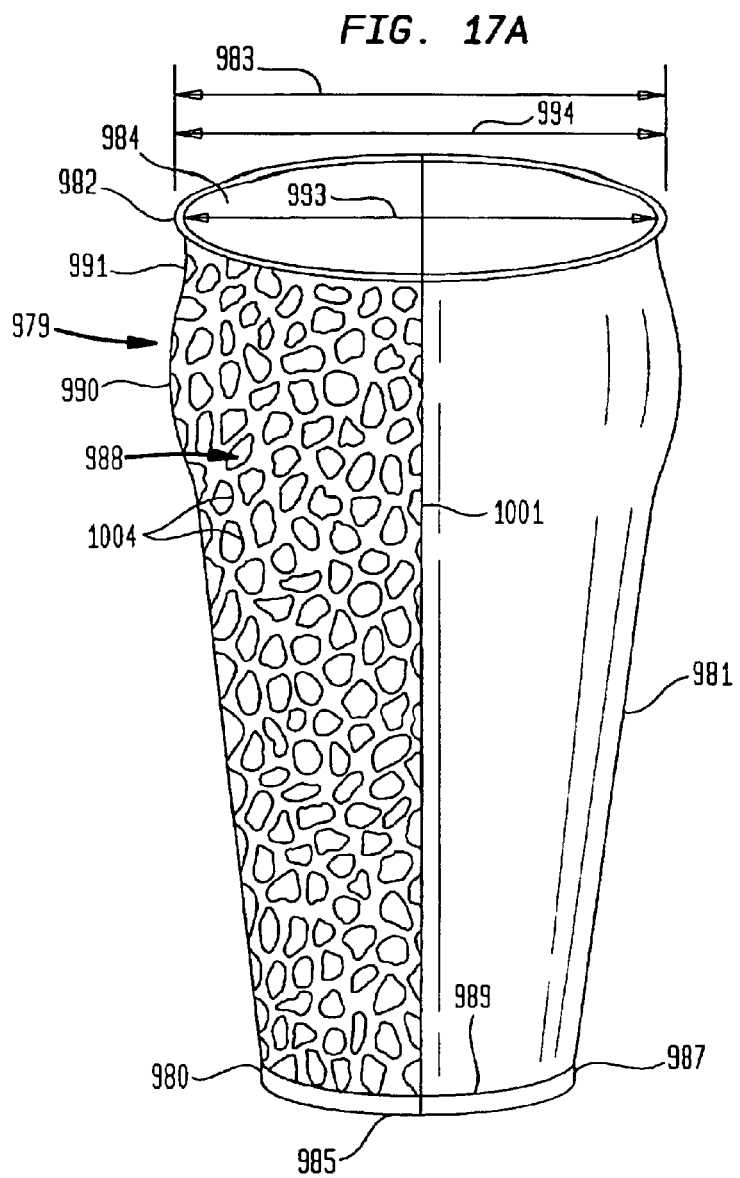
FIG. 17(a) is an elevation of a polycarbonate cup made by injection blow-molding.
Figure 17B:
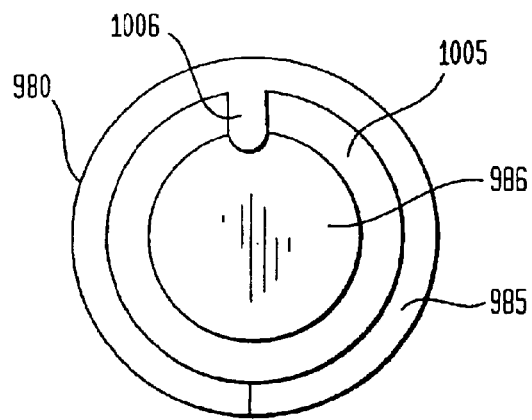
FIG. 17(b) is the bottom or base of the polycarbonate cup of FIG. 17(a)
Figure 17C:
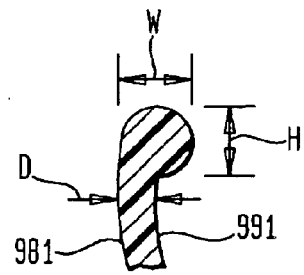
FIG. 17(c) is the fortified rim of the polycarbonate cup of FIG. 17(a)

In accordance with this invention, namely the manufacture of a bell fountain drinking cup as illustrated in FIG. 17(a) from polycarbonate, the following process parameters can be used with the blow-molding apparatus and process as described in U.S. Pat. No. 4,540,543 and above. Initially, the polycarbonate in the form of pellets is dried to remove moisture. Drying conditions of 3.5 hours at 250° F. have been found useful in providing a polycarbonate which can be injection blow-molded into the permaware containers of this invention. The polycarbonate plastic has to be pressure formed into the parison rapidly, hence the molten plastic temperature is left relatively high at from about 450° F. to about 700° F., preferably, from about 500° F. to about 650° F.; and most preferably, a temperature of about 545° F. has been found to yield the desired parison. Injection pressures of 1,000 to 3,000 psi can be used, with an injection pressure of about 2,100 psi being most preferred. The parison has to be removed from the parison mold after the shortest possible dwell therein in order to rapidly proceed to the next molding cycle, yet without tending to adhere to the mold and become deformed thereby. For permaware, which require a thicker parison, the time in the parison mold must yield a stable parison. Dwell times in the parison mold to produce the polycarbonate permaware of this invention range from about 1 to 3 seconds, with 2.5 seconds being most preferred. In general, the temperature of the parison has to reach a level suitable for orientation during the short dwell in the parison mold and the comparatively short time, shortened by the clamp action described herein, during which the parison is transported into the blow mold. The temperature at which the deformation of the parison, i.e., blowing takes place, should be uniformly maintained while the parison is expanding and until it contacts the parison mold. Temperatures ranging from about 250° F. to about 500° F., and most preferably at about 285° F. can be used. In no case must the parison be damaged, nor deformed in the course of any operation to which it is subjected, except of course blowing. A blowing pressure of from about 100 to about 500 psi, preferably, from about 200 to about 400 psi, and most preferably at about 250 psi, is employed. FIGS. 17(a) through 17(c) illustrate a bell fountain tumbler 979 injection blow-molded in accordance with the present invention. The tumbler can be prepared using a split blow cavity employing two separate halves which can be configured exactly the same or differently to provide separate design elements to the tumbler. For example, tumbler 979 can optionally be provided with an embossing design defined by embossed flat surfaces 988 and ridges 1004 which circumscribe the embossed areas 988. The design is operative as a grip for a user since the smooth sidewall is substantially altered. Such tumblers are typically characterized by a seam 1001 along the longitudinal axis of the tumbler. The tumbler 979 has a base portion 980, a sidewall portion 981 and an upper circular rim portion 982 which extends about the periphery 983 of an opening 984 of tumbler 979. Base portion 980 of tumbler 979 is integrally formed with the rest of the tumbler and includes a bottom 985, a base sidewall 987, and an inner face 989 attached integrally to sidewall 981. Tumbler 979 as shown is characterized as a "bell fountain" tumbler in which sidewall 981 extends upwardly to convex portion 990 which extends to concave portion 991 and extends to fortified rim 982. Rim 982 is integrally formed with sidewall 981 and is a continuous generally circular or oval, solid polymer bead extending about periphery 983 of opening 984. Rim 982 has the advantages that it is rounded and does not snag on the mold or snag with a cup cover as a top curl does. For another advantage, a bead type top rim can more compactly provide rigidity and strength to a cup than does a top curl, with less width. While polymer bead rim 982 is shown as circular in cross section, other profiles may be suitable for example, conic sections such as ellipsoid shapes or truncated conic sections or profiles such as truncated conic sections including a semi-circle or a half ellipse. Rim 982 has a width W which is defined by the difference between an inner diameter 993 and an outer diameter 994 of rim 982 and a height H which is the distance over which width W extends. Width W is thicker than the rest of sidewall 981. Sidewall 981 is substantially uniform in thickness on the entire tumbler. In a preferred form of the bell fountain tumbler shown, sidewall 981 has at thickness of 80 mils, height H is approximately 100 mils and width W of rim 982 is approximately 100 mils. Also, base sidewall 987 preferably has a height or thickness of about 100 mils. While the base sidewall 987 can have a height up to 8 times the thickness of sidewall 981, it has been found that under harsh washing conditions, the base tends to deteriorate if it is about 150 mils or more in the polycarbonate tumbler shown. The overall height of the preferred tumbler 979 is 6.625 inches, inner diameter 993 is 3.25 inches, base diameter is 2.325 inches and shoulder 990 has an inner diameter of 3.5 inches. As noted above, tumblers in accordance with the present invention are produced by injection blow-molding thermoplastic optically transparent polymers.

As discussed above, crystal polystyrene available from Dow Corporation of Midland, Mich., grade 685d have been used to produce tumblers by the method of U.S. Pat. No. 4,540,543. However, permaware products formed from polystyrene polymers using the injection blow-molding process described above do not have a consistent durability, are brittle and tend to break. Advantageously, the polycarbonate tumblers of the present invention provide a product having the same desirable clarity of polystyrene tumblers but are more durable such that the polycarbonate tumblers do not break during normal use. It is often desirable to incorporate at the bottom of a tumbler identifying indicia, including the location of the manufacturer, trademarks, even to mold into the bottom certain configurations which enable the tumbler to be printed or packaged.

Figure 18:
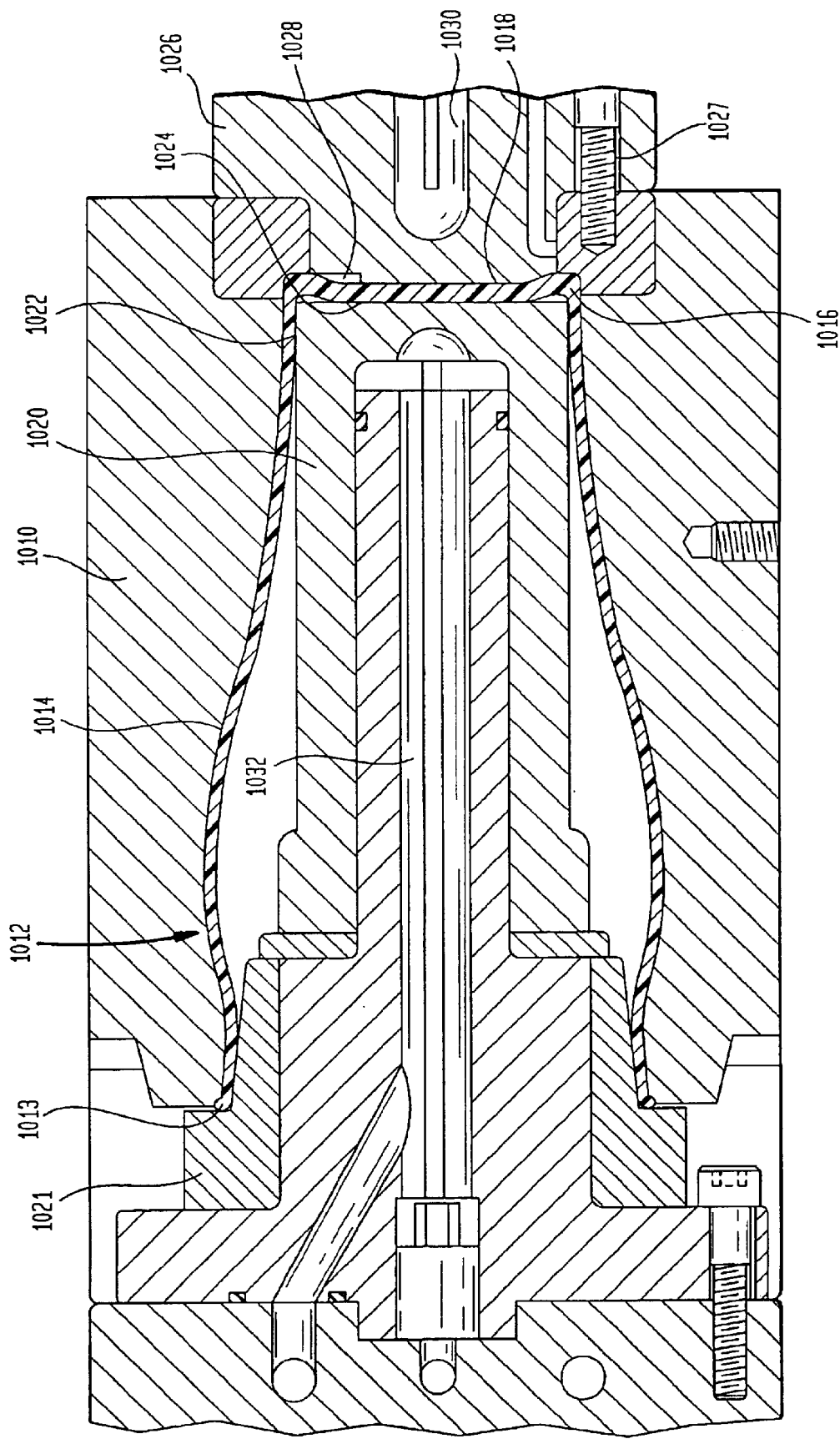
FIG. 18 is a cross sectional view of an alternative ejection core which also provides a means to mold the base of the container.

Referring to FIG. 17(b), it can be seen that the bottom of base 985 has been molded to include a concave, flat portion 986 which includes a rim 1005, both of which locations can be used to imprint product identifying indicia (not shown). FIG. 17(b) also shows where a lug 1006 has been molded into the bottom 985 of base 980. Molded lug 1006 can be used to align the tumbler during any subsequent printing operation. Previous to this invention, the incorporation of such molded indicia or components to the base of a blow-molded article, in particular, an article in which the wall thickness was greater than 50 mil, required a separate noncontinuous step in which the article, such as a tumbler needed to be taken from the blow mold at an elevated temperature, and conveyed by a separate conveyor structure to a stamping operation. For relatively thick walled structures including those having a wall thickness of greater than 50 mils, the molding of the indicia could not take place during blow-molding since the fluid pressure during the blowing step could not press the parison to be molded sufficiently hard against a mold surface to provide acceptable indicia or deep structural configurations to the surface such as the printing lug 1006 shown in FIG. 17(b). In a novel aspect of the present invention, the polycarbonate tumbler of the present invention can be blow-molded and the base thereof reconfigured in a continuous manner without the need to remove the tumbler from the blow mold and convey the tumbler away from the apparatus to a separate stamping operation. The base molding method and apparatus which are novel to the present invention can be described by referring to FIG. 18. Thus, after removal of the core from the blow-molding station, as described above, an alternative ejection core can be inserted into the blow cavity which contains the blow-molded container. This alternative ejection core provides a slight pressure against the inside surface of the container pressing the bottom surface of the container against a preformed mold. More specifically, shown in FIG. 18 is the blow cavity of a blow mold 110 such as a blow station 913 as shown in FIG. 11. Within the blow cavity is the blow-molded tumbler 1012 which includes a sidewall 1014 and a base 1016 which has a bottom surface 1018 which is to be provided with indicia or other structural configurations such as printing lug 1006 as shown in FIG. 17(b).

Figure 19:
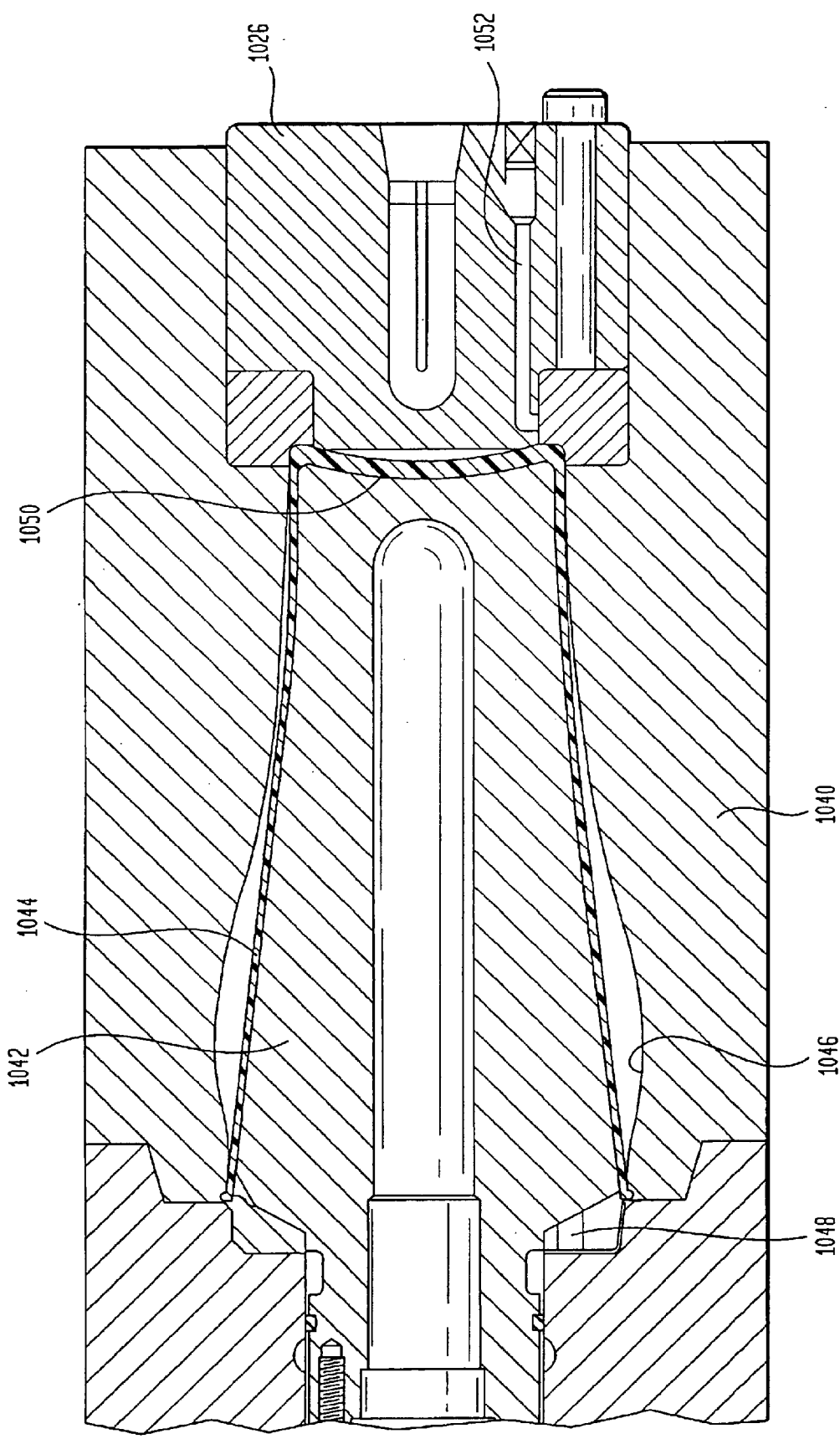
FIG. 19 is a cross sectional view of an alternative blow mold.

In accordance with the molding operation of the present invention, after the blow-molding step and once the core has been removed from the blow mold 1010 of FIG. 18, for example, an ejection core 1020 is inserted into the blow cavity and the tumbler 1012 which remains therein. Ejection core 1020 is wide enough to contact the inside edge of sidewall 1014 near or at the base 1016 of tumbler 1012. Such contact is shown at location 1022. Bottom edge 1024 of ejection core 1020 contacts the inside surface of base 1016 and pushes the tumbler 1012 against a mold 1026. Ejection core 1020 can also include a circumferential lip 1021 which engages the lip 1013 of tumbler 1012 so as to aid in pushing tumbler 1012 uniformly against the surface of mold 1026. In FIG. 18, mold 1026 is shown containing a mold configuration 1028 which is capable of forming a printing lug on the bottom 1018 of base 1016 such as equivalent to printing lug 1006 shown in FIG. 17(b). Mold 1026 can be secured to blow cavity 1010 via threaded connector 1027. It has been found that the mechanical pressure of ejection core 1020 against the inside surface of base 1016 provides adequate pressure against the mold 1026 to adequately stamp any indicia or other configuration into the base of the tumbler. Typically, the pressure of the ejection core 1020 against the base 1016 within the blow cavity to mold or stamp the base takes approximately 0.5 second. Mold 1026 can include a cooling channel 1030 to provide the cooling of the base subsequent to the molding operation. Likewise, ejection core 1020 can also be provided with a cooling channel 1032. In each of cooling channels 1030 and 1032, cooling fluids such as water can be circulated therein to provide the proper temperature. Subsequent to the molding or stamping operation, the ejection core 1020 is removed from the blow cavity. Since the mandrel 1020 contacts the inside sidewall 1014 of tumbler 1012, the tumbler is removed from the blow cavity as well and transferred to any conveying station as described previously. The ejection core 1020 is an alternative to the ejection core 950 shown in FIGS. 11, 12 and 13 and can be attached to a motive means as described above with respect to core 950 to provide a continuous process of injection blow-molding and molding the base of the tumbler. Another improvement in this invention for injection blow-molding permaware polycarbonate tumblers in which a sidewall thickness of greater than 950 mils is provided is shown in FIG. 19. FIG. 19 is an alternative blow mold cavity configuration which is different than, for example, the blow cores shown in FIGS. 14 and 15. Thus, in the previous description, blowing of the parison into the molded tumbler was achieved by directing fluid through a blow slot in the core which directed the fluid at the base of the parison mold. Subsequently, the fluid pressure would work its way up the mold and be vented from the entrance of the mold. With respect to the tumbler, the initial fluid pressure would be at the base of the tumbler and work its way along the sidewall to the tumbler opening. In accordance with this invention, it has been found that a uniform blow-molded tumbler can be better achieved by directing the fluid pressure during the blow stage from the top of the mold and working down toward the base of the blow cavity or, with respect to the tumbler, blowing the parison at the opening of the tumbler and working down toward the base of the tumbler. Such configuration is shown in FIG. 19 which includes a blow mold 1040 into which has already been inserted the core 1042 which contains the injected molded parison 1044 contained along the outside surface of core 1042. The blow mold 1040 includes a mold surface 1046 in the shape of the bell fountain tumbler shown in FIG. 17(a). The core 1042 includes a blow vent 1048 which releases a fluid into the mold 1040 near the entrance thereof or with respect to the tumbler, near the opening of the tumbler. The fluid pressure travels down the core 1042 blowing and pressing the parison 1044 against mold surface 1046 from the top of the parison to the base 1050 of the parison. Blow mold 1040 also includes the base mold 1026 as described in FIG. 18 which allows the molding of the base of the blow-molded tumbler once core 1042 is removed and ejection core 1020 is inserted. Mold 1026 includes a vent 1052 connected to the blow cavity to vent excess fluid pressure. It has been found that a more uniform sidewall can be achieved by blowing from the opening of the parison/tumbler to the base thereof. This method of blowing the parison has previously been done to blow polystyrene disposable containers but is not believed to have been done with resins other than polystyrene and not to form permaware tumblers having sidewall thicknesses of greater than 50 mils. The reusable containers of the present invention are formed from aromatic polycarbonates preferably having a weight average molecular weight of from about 10,000 to 200,000, most preferably from about 20,000 to 80,000, and most particularly a melt flow rate range of from about 10 to 22 g/10 min (ASTM D-1238) and which are prepared by methods known to those skilled in the art and more particularly by methods disclosed in U.S. Pat. Nos. 3,028,365, 2,999,846, 3,248,414, 3,153,008, 3,215,668, 3,187,065, 2,964,794, 2,970,131, 2,991,273 and 2,999,835, all incorporated herein by reference. The aromatic polycarbonates useful in practice of the invention are produced by reacting di-(monohydroxyaryl)alkanes (bisphenols) or dihydroxybenzenes and substituted dihydroxybenzenes with derivatives of carbonic acid such as carbonic acid diesters, phosgene, bis-chlorocarbonic acid esters of di-(monohydroxyaryl)-alkanes and the bis-chlorocarbonic acid esters of the dihydroxy-benzenes and the substituted dihydroxy-benzenes. By aromatic polycarbonate, in the sense of the present invention, there are understood homopolycarbonate and copolycarbonate resins which are based, for example, on one or more of the following bisphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)ethers, bis-(hydroxyphenyl)-ketones, bis-(hydroxyphenyl)-sulphoxides, bis-(hydroxyphenyl)-sulphones and α, α-bis-(hydroxyphenyl)-diisopropylbenzenes, as well as heir nuclear-alkylated and nuclear-halogenated compounds. These and further suitable aromatic dihydroxy compounds are described, for example, in U.S. Pat. Nos. 3,028,365, 2,999,835, 3,148,172, 3,271,368, 2,991,273, 3,271,367, 3,280,078, 3,014,891 and 2,999,846 (all incorporated herein by reference), in German Offenlegungsschriften (German Published Specifications) 1,570, 703, 2,063,050, 2,063,052, 2,211,956 and 2,211,957, in French Patent Specification No. 1,561,518 and in the monograph "H. Schnell, Chemistry and Physics of Polycarbonates, Interscience Publishers, New York, 1964". Preferred bisphenols are those of the formula I:

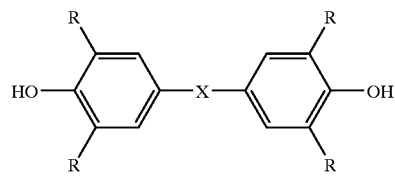

in which R is identical or different and denotes H, $C_1$–$C_4$-alkyl, Cl or Br; preferably H or $C_1$–$C_4$-alkyl, and in which X is a bond, $C_1$–$C_8$-alkylene, $C_2$–$C_8$-alkylidene, $C_5$–$C_{15}$-cycloalkyene, $C_5$–$C_{15}$-cycloalkylidene, —S—, —$SO_2$—, —SO—, —CO— or

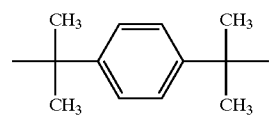

Examples of these bisphenols are: 4,4'-dihydroxydiphenyl, 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, a, a-bis-(4-hydroxyphenyl)-p-diisopropyl-benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis(3,5-dimethyl-4-hydroxyphenyl)-sulphone, 2,4-bis-(3,5-dimethyl-4-hydroxyphenyl)-methylbutane, 1,1-bis-(3,5-dimethyl-4-hydroxyphenyl)cyclohexane, α,α-bis-(3,5-dimethyl-4-hydroxyphenyl)-p-diisopropyl-benzene, 2—2-bis-3,5-dichloro-4-hydroxyphenyl)-propane and 2,2-bis-(3,5-dichloro-4-hydroxyphenyl)-propane and 2,2-bis-(3,5-dibromo-4-hydroxyphenyl)-propane (tetrabromo bisphenol A).

Examples of particularly preferred bisphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Preferred aromatic polycarbonates are those which are based on one or more of the bisphenols mentioned as being preferred. Particularly preferred copolycarbonates are those based on 2,2-bis-(hydroxyphenyl)-propane and one of the other bisphenols mentioned as being particularly preferred. Further particularly preferred polycarbonates are those based solely on 2,2-bis-(4-hydroxyphenyl)-propane or 2,2-bis-(3,5-dimethyl-4-hydroxyphenyl)-propane.

The aromatic high-molecular weight polycarbonates can be branched due to the incorporation of small amounts, preferably of between about 0.05 and 2.0 mol % let, 15 (relative to diphenols employed), or trifunctional or more than trifunctional compounds, especially compounds with three or more phenolic hydroxyl groups. Polycarbonates of this type are described, for example, in German Offenlegungsschriften (German Published Specifications) 1,570, 533, 1,595,762, 2,116,974 and 2,113,347, British Patent Specifications No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane-2,4,6-dimethyl-2,4,6-tri-(4-hydroxyphenyl)-heptane, 1,4,5-tri-(4-hydroxyphenyl)-benzene, 1, 1, 1-tri(4- hydroxyphenyl)ethane tri-(4-hydroxyphenyl)-phenylmethane, 2,2-bis-[4,4-bis-(4-hydroxyphenyl)-cyclohexyl]-phenol, 2,6-bis-(4-hydroxyphenyl-isopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)phenyl) orthoterephthalic acid ester, tetra-(4-hydroxyphenyl)-methane, tetra(4-(4-hydroxyphenylisopropyl)-phenoxy)-methane and 1,4-bis-((4',4"-dihydroxytriphenyl)-methyl)-benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole.

Particularly preferred polycarbonates which can be used to injection blow mold the permaware containers of this invention are the Calibre 200 Series polycarbonates from Dow Chemical Canada, Inc., Sarnia, Ontario. Specifically, Calibre 200-22 has been found particularly useful.

In high speed operation, such as the one at which this invention is aimed, several factors have to be reconciled: the plastic has to be pressure formed rapidly, hence its temperature is left relatively high; the parison has to be removed from the parison mold after the shortest possible dwell therein, in order to proceed to the next molding cycle, all without tending to adhere to the mold and becoming deformed thereby; the temperature of the parison has to reach a level suitable for orientation during the short dwell in the parison mold and the comparatively short time, shortened by the clamp action described herein, during which the parison is transported into the blow mold; the temperature at which the deformation of the parison, i.e., blowing takes place should be uniformly maintained while the parison is expanding and until it contacts the parison mold; in no case must the parison be damaged, nor deformed in the course of any operation to which it is subjected, except of course blowing.

A typical use of this invention in another aspect will serve as an example hereinbelow, namely the manufacture of a thin-walled drinking cup of generally known configuration, from polystyrene, e.g. Styron 685 made by the Dow Chemical Company. In order to obtain satisfactory filling of the mold at a fast rate, it is injected at 560°–570° F. The parison tends to adhere to the parison mold cavity wall until its temperature drops to approximately 150° F. The newly molded parison, with a wall thickness increasing from 0.3 mm to 0.6 mm from its open end towards its bottom dwells in the parison mold for approximately 0.8 seconds with the mold cavity wall at a temperature of 140° F. which is long enough for the parison to become removable without sticking. The core in turn is kept at a temperature of 260° F. for the most part, with the region near the blow slot separately controlled at 220° F. or slightly lower to minimize penetration of the plastic thereinto.

As a result, temperatures of the inner and outer surface of the parison are so balanced under action of the core and mold respectively that said parison remains highly deformable while being readily separated from the parison mold cavity and transferred to the blow mold. Once placed into the blow mold, a blowing pressure of 100–300 psi is applied which may be accompanied by forward movement of pusher plate 952 in order to center the parison or the movable element of the blow core shown in FIG. 15, to stretch it into contact with the blow mold. If such movement of the blow core element is used, it must not precede initiation of blowing, so as to assure that no friction or adhesion exists between the parison and the core while the former is being moved axially.

The injection blow-molding process and apparatus disclosed in U.S. Pat. No. 4,540,543 have been used to form containers, cups, tumblers and the like from thermoplastic optically transparent polymers, in particular, from polystyrene. Such containers were disposable having a nominal sidewall thickness substantially less than 50 mils. Permaware products, such as those having thicknesses of greater than 50 mils, and formed from polystyrene polymers using the injection blow-molding process described above do not have a consistent durability, are brittle and tend to break. Accordingly, there has been a need to find alternative polymers which can be injection blow-molded using the process described above and which can provide a product having the same desirable clarity of polystyrene tumblers but which are more durable.

In accordance with still yet another aspect of the present invention, it has been found that the injection blow-molding process described in U.S. Pat. No. 4,540,543 can be operated to form hollow containers using resins other than unfilled polystyrene which is the only polymer disclosed in the mentioned patent. Thus, it has been found that polycarbonate, polyethylene terephthalate, polycarbonate and ABS mixtures, acrylic resins, clarified polypropylene and polyvinylchloride, as well as the filled polymers described above, can be successfully injection blow-molded into transparent containers. Additionally, the other resin or mixed resin alternatives to unfilled polystyrene which are useful in this invention include filled resins such as filled polystyrene, polycarbonate, polyethylene terephthalate, mixtures of polycarbonate and ABS resins, acrylic resins, clarified polypropylene and polyvinyl chloride. It is most advantageous that the filled resin systems have the flowability necessary for injection blow-molding, can maintain at least the initial strength of the unfilled resin and, in particular, remain transparent which is a highly desired property when injection blow-molding containers such as plastic drinking tumblers or "glasses". Accordingly, the process of the present invention is particularly useful in injection blow-molding transparent drinking containers from filled resins which have been characterized as "nano-composites". Nano-composites are reinforced resins which comprise the resins enumerated above and nanometer-sized filler particles. It has been found that resins containing small amounts of approximately 2–5% of the nanometer-sized particles can provide improvements in mechanical and thermal properties, improvements in gas barrier and flame resistance and do not reduce the light transmission of the resins inasmuch as the nanometer-sized particles are in the same size range as visible light wave lengths. A discussion of nano-composites is provided in Plastics Technology, June, 1999. Accordingly, nano-composites can advantageously be used to injection blow mold drinking containers such as tumblers and the like. Thus, not only would the transparent nature of the resins be maintained, but the strength of the resin could be improved. For polystyrene, the use of a nanometer-sized filler could improve the strength of the resin and provide more uses of this resin than for just disposable tumblers.

At present, nanometer-sized clay has been used to form nano-composites. For example, montmorillonite, which is a layered alumino-silicate having individual platelets that measure on the order of 1 micron diameter and have an aspect ratio of 1,000:1 have been added to nylon. Suppliers of the nanometer montmorillonite are Nanocor, Inc. And Southern Clay Products. For some of the above listed resins, it may be useful to chemically modify the surface of the montmorillonite inasmuch as this hydrophilic clay may not be compatible with the more hydrophobic resins. Surface treatments can include exchanging the inorganic cations on the surface of the clay with materials which can induce hydrogen bonding with the resin including hydrogen cations, ammonium cations, silane cations and the like. Other fillers can be formed chemically or ground to the appropriate size and used as fillers for the injection blow moldable resins of this invention. For example, inorganic or organic pigments such as zinc oxide, or titanium oxide can be used. Even plastic fillers can be provided in nanometer sizes and added to the blow moldable resins.

The nanocomposites can be formed by forming the resin itself in the presence of the nano-filler particles or by simply melt compounding the formed resin with the nano-filler particles. During the melt compounding method of forming nano-clay composites, it has been found necessary to delaminate the clay particles sufficiently so that the ultimate level of reinforcement and transparency can be achieved.

The injection blow-molding of these alternative resins can be used to form both disposable and permaware containers having nominal sidewall thicknesses of from 10 to 50 mils and greater than 50 mils to 500 mils, respectively. While each of the resins may need to be processed differently from the others, typically, the molten resin is pressure formed into the parison rapidly, at a relatively high temperature ranging from about 300° to 850° F. so as to form the desired parison. Injection pressures of 1,00 to 3,500 psi can be used. Dwell times of the parison in the parison mold will generally range from 0.5 to 3.5 seconds depending on the setting ability of the polymer used and the thickness of the article to be formed. The temperature at which the deformation of the parison, i.e., blow-molding, takes place should be uniformly maintained while the parison is expanding and until it contacts the blow cavity mold. Temperatures ranging from about 200° to 600° F. can be used. In no case must the parison be damaged, nor deformed in the course of any operation to which it is subjected, except of course blowing. A blowing pressure of from about 100 to 500 psi, preferably from about 200 to 400 psi can be employed.

It is often desirable to incorporate at the bottom of a tumbler identifying indicia, including the location of the manufacturer, trademarks, even to mold into the bottom certain configurations which enable the tumbler to be printed or packaged. For example, one or more molded lugs can be molded into the base of the container and used to align the container during any subsequent printing operation. Previous to this invention, the incorporation of such molded indicia or components to the base of a blow-molded article, in particular, an article in which the wall thickness was greater than 50 mil, required a separate noncontinuous step in which the article, such as a tumbler needed to be taken from the blow mold at an elevated temperature, and conveyed by a conveyor structure to a separate stamping operation. For relatively thick walled structures including those having a wall thickness of greater than 50 mils, the molding of the indicia could not take place during blow-molding since the fluid pressure during the blowing step could not press the parison to be molded sufficiently hard against a mold surface to mold acceptable indicia or deep structural configurations such as a printing lug into the surface.

In a novel aspect of the present invention, containers such as cups, tumblers and the like can be blow-molded and the base thereof reconfigured in a continuous manner without the need to remove the tumbler from the blow mold and convey the tumbler away from the apparatus to a separate stamping operation.

The base molding method and apparatus which are novel to the present invention in one embodiment can be described by referring to FIG. 18. Thus, after removal of the core from the blow-molding station, as described above, an alternative ejection core can be inserted into the blow cavity which contains the blow-molded container. This alternative ejection core provides a slight pressure against the inside surface of the cup pressing the bottom surface of the cup against a preformed mold. More specifically, shown in FIG. 18 is a blow mold such as at blow station 913 as shown in FIG. 11. Within the blow cavity is the blow-molded tumbler 1012 in the form of a "bell fountain" tumbler which includes a sidewall 1014 and a base 1016 which has a bottom surface 1018 which is to be provided with indicia or other structural configurations such as a printing. In accordance with the molding operation of the present invention, once the core has been removed from the blow mold 1010 subsequent to the blowing step, an ejection core 1020 is inserted into the blow cavity and the tumbler 1012 which remains therein. Ejection core 1020 is wide enough to contact the inside edge of sidewall 1014 near or at the base 1016 of tumbler 1012. Such contact is shown at location 1022. Bottom edge 1024 of ejection core 1020 contacts the inside surface of base 1016 and pushes the tumbler 1012 against a mold 1026. Ejection core 1020 can also include a circumferential lip 1021 which engages the lip 1013 of tumbler 1012 so as to aid in pushing tumbler 1012 uniformly against the surface of mold 1026. In FIG. 18, mold 1026 is shown containing a mold configuration 1028 which is capable of forming a printing lug on the bottom 1018 of base 1016. Mold 1026 can contain other mold features including indicia or trademark logos and the like. Mold 1026 can be secured to blow mold 1010 via threaded connector 1027. It has been found that the mechanical pressure of ejection core 1020 against the inside surface of base 1016 provides adequate pressure against the mold 1026 to adequately stamp any indicia or other configuration into the base of the tumbler. Typically, the pressure of the ejection core 1020 against the base 1016 within the blow cavity to mold or stamp the base takes approximately 0.5 second. Mold 1026 can include a cooling channel 1030 to provide the cooling of the base subsequent to the molding operation. Likewise, ejection core 1020 can also be provided with a cooling channel 1032. In each of cooling channels 1030 and 1032, cooling fluids such as water can be circulated therein to provide the proper temperature. Subsequent to the molding or stamping operation, the ejection core 1020 is removed from the blow cavity. Since the mandrel 1020 contacts the inside sidewall 1014 of tumbler 1012, the tumbler is removed from the blow cavity as well and transferred to any conveying station as described previously. The ejection core 1020 is an alternative to the ejection core 950 shown in FIGS. 11, 12 and 13 and can be attached to a motive means as described above with respect to core 950 to provide a continuous process of injection blow-molding and molding the base of the tumbler.

Another improvement relative to U.S. Pat. No. 4,540,543 is shown in FIG. 19. FIG. 19 is an alternative blow mold cavity configuration which is different than, for example, the blow cores shown in FIGS. 14 and 15. Thus, in the previous description, blowing of the parison into the molded tumbler was achieved by directing fluid through a blow slot in the core which directed the fluid at the base of the parison mold. Subsequently, the fluid pressure would work its way up the mold and be vented from the entrance of the mold. With respect to the tumbler, the initial fluid pressure would be at the base of the tumbler and work its way along the sidewall to the tumbler opening. In accordance with this invention, it has been found that a uniform blow-molded tumbler can be better achieved by directing the fluid pressure during the blow stage from the top of the mold and working down toward the base of the blow cavity or, with respect to the tumbler, blowing the parison at the opening of the tumbler and working down toward the base of the tumbler. Such configuration is shown in FIG. 19 which includes a blow mold 1040 into which has already been inserted the core 1042 which contains the injected molded parison 1044 contained along the outside surface of core 1042. The blow mold includes a mold surface 1046 in the shape of the bell fountain tumbler. The core 1042 includes a blow vent 1048 which releases a fluid into the mold 1040 near the entrance thereof or with respect to the tumbler, near the opening of the tumbler. The fluid pressure travels down the core 1042 blowing and pressing the parison 1044 against mold surface 1046 from the top of the parison to the base 1050 of the parison. Blow cavity 1040 also includes the base mold 1026 as described in FIG. 18 which allows the molding of the base of the blow-molded tumbler once core 1042 is removed and ejection core 1020 is inserted. Mold 1026 includes a vent 1052 connected to mold 1040 to vent excess fluid pressure. It has been found that a more uniform sidewall can be achieved by blowing from the opening of the parison/tumbler to the base thereof. This method of blowing the parison has previously been done to blow polystyrene disposable containers but is not believed to have been done with resins other than polystyrene and not to form permaware tumblers having sidewall thicknesses of greater than 50 mils.

Optical/Physical Properties

The inventive tumblers characteristically exhibit enhanced optical properties and crack resistance over prior art disposable cups. Unless otherwise indicated, cups described below are fabricated from unfilled resins. There is shown in Table 2 below a comparison of haze values of an injection blow-molded tumbler of FIG. 8 made from PET with corresponding thermoformed cups.

TABLE 2

| | Optical Properties HAZE VALUES | | |
|---|---|---|---|
| | Injection Blow-Molded Tumbler or Figure 8 (PET) | Thermoformed PET Cup 1 | Thermoformed PET Cup 2 |
| 1 | 1.33 | 4.34 | 3.97 |
| 2 | 1.22 | 2.82 | 2.94 |
| 3 | 1.38 | 3.00 | 7.92 |
| 4 | 1.41 | 3.13 | 4.62 |
| 5 | 1.91 | 2.98 | 4.42 |
| 6 | 1.48 | 2.52 | |
| Avg | 1.46 | 3.13 | 4.77 |
| Std | 0.239 | 0.628 | 1.875 |

Tumblers with a fortified, beaded rim produced in accordance with the present invention likewise exhibit improved toughness over cups with a "U" shaped upper rim as are know. In this regard, a test was devised to simulate impact resistance as follows:

The tumblers (or tumbler stack in the case of a nested column) were clamped about their bases to be in a free-standing position and a cylindrical suspended weight was positioned to be at rest with its cylinder wall adjacent the rim of the tumbler. The weight was then drawn to a predetermined angle from the vertical and released. The angle with vertical at failure was recorded and the energy dissipated at impact was calculated based on the height to which the cylindrical weight was raised above the rest position.

Utilizing the above procedure, polystyrene cups having the general characteristics of the cups of FIG. 8 ("beaded") were compared with similar cups with a "U" shaped brim. The cups of the invention had a wall thickness of about 15 mils and a bead thickness of 63.7 mils about its brim. Results appear in Table 3, wherein it can be seen the cups of the invention exhibit an energy to failure of nearly twice that of cups with a "U" shaped brim.

TABLE 3

Pendulum Test Energy to Failure for Beaded and "U" Shaped Brim Polystyrene Cups (Nested Cups)

| Cup ID | Pendulum Weight lbs | Pendulum Length inches | Pendulum Angle At Failure Degree | Energy to Failure lb-in | Energy to Failure Average |
|---|---|---|---|---|---|
| Beaded | 0.941816 | 25.5 | 20 | 1.45 | |
| Beaded | 0.941816 | 25.5 | 25 | 2.25 | |
| Beaded | 0.941816 | 25.5 | 25 | 2.25 | |
| Beaded | 0.941816 | 25.5 | 25. | 2.25 | |
| Beaded | 0.941816 | 25.5 | 25 | 2.25 | 2.09 |
| "U" | 0.941816 | 25.5 | 20 | 1.45 | |
| "U" | 0.941816 | 25.5 | 15 | 0.82 | |
| "U" | 0.941816 | 25.5 | 15 | 0.82 | |
| "U" | 0.941816 | 25.5 | 15 | 0.82 | |
| "U" | 0.941816 | 25.5 | 20 | 1.45 | 1.07 |

The material from which the cups are made likewise affects the toughness of the product as does the various design elements of the tumbler. Utilizing the above procedure (with tighter clamping of the cups) tumblers having the general characteristics of FIGS. 3(*a*)–3(*c*) were tested for impact resistance as indicated in Table 4, as well as for crush loads and deflections (Instron).

The various tumblers of Table 4 had the characteristics noted as well as the following:

1. Tumbler A had a wall thickness of 0.0218 inches and a rim bead thickness of 0.030 inches;
2. Tumbler B had a wall thickness of 0.0227 inches and a rim bead diameter of 0.047 inches; and
3. Tumbler C likewise had a wall thickness of 0.0227 inches and a rim bead diameter of 0.047 inches.

The particular grade of PET employed for Tumbler C was MN058, available from Eastman Chemicals, Kingsport, Tenn.

TABLE 4

"Cut Glass" IBM Tumbler Data

| Tumbler | Material | Volume (oz) | Cup Height (in) | Weight (g) | Brim Crush Disp. (in) | Brim Crush Load (lbf) | Brim Crush Energy (lbf-in) | Cup Rigidity Dry (lb) | Pendulum Failure Angle (Degree) | Pendulum Energy (lbf-in) | Failure Mode |
|---|---|---|---|---|---|---|---|---|---|---|---|
| A | PS | 14 | 5.75 | 17.27 | 1.58 | 3.63 | 2.69 | 1.53 | 20.0 | 6.6 | Pieces |
| B | PS | 14 | 5.75 | 18.82 | 1.20 | 4.08 | 1.72 | 2.18 | 17.0 | 4.1 | Cracks |
| C | PET | 14 | 5.75 | 24.99 | 1.78 | 7.40 | 6.06 | 1.84 | 35.0 | 16.9 | Creases |

The material employed likewise has a corresponding effect on the impact resistance of the cups of FIG. 8. Utilizing the above procedures, cups designed in accordance with FIG. 8 having a volume of 16 ounces, a wall thickness of 15 mils and a rim bead diameter of 0.0637 inches were fabricated and tested as shown in Table 5.

TABLE 5

Impact/Rigidity/Crush for PET Tumblers

| Tumbler | Material | Volume (oz) | Cup Height (in) | Weight (g) | Brim Crush Disp. (in) | Brim Crush Load (lbf) | Brim Crush Energy (lbf-in) | Bottom Crush Disp. (in) | Bottom Crush Load (lbf) | Bottom Crush Energy (lbf-in) | Cup Rigidity Dry (lb) | Pendulum Failure Angle (Degree) | Pendulum Energy to Break (lbf-in) | Failure Mode |
|---|---|---|---|---|---|---|---|---|---|---|---|---|---|---|
| D | PET | 16 | 4.90 | 24.10 | 1.57 | 4.65 | 3.90 | 0.11 | 40.44 | 2.23 | 0.85 | 42.0 | 24.0 | Minor creases |
| E | PET | 16 | 4.90 | 24.60 | 1.58 | 4.70 | 4.01 | 0.12 | 49.64 | 3.19 | 0.86 | 40.0 | 21.9 | Minor creases |
| F | PET | 16 | 4.90 | 24.02 | 1.50 | 4.39 | 3.50 | 0.12 | 49.87 | 3.06 | 0.83 | 45.0 | 27.4 | Minor creases |

It can be seen from Table 5 that PET cups with dimensions similar to the polystyrene cups of Table 3 exhibit greatly enhanced impact resistance.

Still yet another material useful for the present invention is K resin (Phillips Petroleum). Utilizing the procedures detailed above, there is shown in Table 6 a comparison of a polystyrene tumbler (Sample G) having the configuration of the tumbler of FIG. 8 hereof with a K resin/polystyrene (11.5% butadiene) tumbler (Sample H) having the configuration of FIG. 8. The tumbler of Sample H was made with a K resin having 24.5 wt. % butadiene blended with polystyrene.

K resin is a copolymer of styrene and butadiene and is available from Phillips Petroleum, Bartlesville, Okla. Particularly preferred grades included from about 2 to about 40 wt. % butadiene.

It can be seen from Table 6 that K resin tumblers in accordance with the invention exhibit high impact resistance.

The polymeric composition of this invention may further contain one or more agents to improve the impact strength, i.e., an impact modifier other than or in addition to butadiene/styrene copolymers.

So-called core-shell polymers built up from a rubber-like core on which one or more shells have been grafted may be used. The core usually consists substantially of an acrylate rubber or a butadiene rubber. One or more shells have been grafted on the core. Usually these shells are built up for the greater part from a vinylaromatic compound and/or a vinylcyanide and/or an alkyl(meth)acrylate and/or (meth)acrylic acid. The core and/or the shell(s) often comprise multifunctional compounds which may act as a cross-linking agent and/or as a grafting agent. These polymers are usually prepared in several stages.

Olefin-containing copolymers such as olefin acrylates and olefin diene terpolymers can also be used as impact modifiers in the present compositions. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example, EPSYN 704 from Copolymer Rubber Company. They are more fully described in U.S. Pat. No. 4,559,388, incorporated by reference herein.

Various rubber polymers and copolymers can also be employed as impact modifiers. Examples of such rubbery polymers are polybutadiene, polyisoprene, and various other polymers or copolymers having a rubbery dienic monomer.

Styrene-containing polymers can also be used as impact modifiers. Examples of such polymers are acrylonitrile-butadiene-styrene, styrene-acrylonitrile, acrylonitrile-butadiene-alpha-methylstyrene, styrene-butadiene, styrene butadiene styrene, diethylene butadiene styrene, methacrylate-butadiene-styrene, high rubber graft ABS, and other high impact styrene-containing polymers such as, for example, high impact polystyrene. Other known impact modifiers include various elastomeric materials such as organic silicone rubbers, elastomeric fluorohydrocarbons, elastomeric polyesters, the random block polysiloxane-polycarbonate copolymers, and the like. The preferred organopolysiloxane-polycarbonate block copolymers are the dimethylsiloxane-polycarbonate block copolymers in some embodiments.

TABLE 6

Comparison of K Resin/Polystyrene Tumbler

| | Cup | | | Brim Crush | | | | Bottom Crush | | | |
|---|---|---|---|---|---|---|---|---|---|---|---|
| Sample | Volume (oz) | Height (in) | Weight (g) | Displ. (in) | Load (lbf) | Energy (lbf-in) | Failure Mode | Displ. (in) | Load (lbf) | Energy Lbf-in) | Failure Mode |
| G | 16 | 4.88 | 17.50 | 0.95 | 3.38 | 1.73 | Cracks | 0.08 | 26.00 | 1.01 | Cracks |
| H | 16 | 4.88 | 17.21 | 2.08 | 3.65 | 4.63 | Creases | 0.11 | 34.07 | 1.63 | Creases |

| | Cup | | Pendulum | | | |
|---|---|---|---|---|---|---|
| Sample | Rigidity Dry (lb) | Disagreeable Odor Scale 0–10 | Failure Angle (Degree) | Energy to break (lbf-in) | Failure mode | Sample |
| G | 0.97 | 2 | 20 | 5.6 | 60% cracks 40% pieces | 10 |
| H | 0.57 | 7 | 33.5 | 15.5 | 60% cracks 40% creases | 10 |

Injection blow-molded tumblers may be produced in accordance with the present invention utilizing polymeric compositions filled with conventional inorganic fillers such as talc, mica, wollastonite and the like, wherein the polymer component is, for example, a polyester, a polystyrene homopolymer or copolymer, or a polyolefin. While any suitable polymer may be used, polypropylene polymers which are suitable are preferably selected from the group consisting of isotactic polypropylene, and copolymers of propylene and ethylene wherein the ethylene moiety is less than about 10% of the units making up the polymer, and mixtures thereof. Generally, such polymers have a melt flow index from about 0.3 to about 4, but most preferably the polymer is isotactic polypropylene with a melt-flow index of about 1.5. In some preferred embodiments, the melt-compounded composition from 1 which the articles are made may include polypropylene and optionally further includes a polyethylene component and titanium dioxide. A polyethylene polymer or component may be any suitable polyethylene such as HDPE, LDPE, MDPE, LLDPE or mixtures thereof and may be melt-blended with polypropylene if so desired.

The various polyethylene polymers referred to herein are described at length in the *Encyclopedia of polymer Science & Engineering* (2d Ed.), Vol. 6; pp: 383–522, Wiley 1986; the disclosure of which is incorporated herein by reference. HDPE refers to high density polyethylene which is substantially linear and has a density of generally greater that 0.94 up to about 0.97 g/cc. LDPE refers to low density polyethylene which is characterized by relatively long chain branching and a density of about 0.912 to about 0.925 g/cc. LLDPE or linear low density polyethylene is characterized by short chain branching and a density of from about 0.92 to about 0.94 g/cc. Finally, intermediate density polyethylene (MDPE) is characterized by relatively low branching and a density of from about 0.925 to about 0.94 g/cc.

Typically, in filled plastics the primary mineral filler is mica, talc, kaolin, bentonite, wollastonite, milled glass fiber, glass beads (solid or hollow), silica, or silicon carbide whiskers or mixtures thereof. We have discovered that polypropylene may be melt-compounded with acidic-type minerals such as mica, as well as inorganic materials and/or basic materials such as calcium carbonate, talc, barium sulfate, calcium sulfate, magnesium sulfate, clays, glass, dolomite, alumina, ceramics, calcium carbide, silica, pigments such as titanium dioxide based pigments and so on. Many of these materials are enumerated in the *Encyclopedia of materials Science and Engineering*, Vol. # 3, pp. 1745–1759, MIT Press, Cambridge, Mass. (1986), the disclosure of which is incorporated herein by reference. Combinations of fillers are preferred in some embodiments.

Mineral fillers are sometimes referred to by their chemical names. Kaolins, for example, are hydrous alumino silicates, while feldspar is an anhydrous alkalialumino silicate. Bentonite is usually an aluminum silicate clay and talc is hydrated mangesium silicate. Glass, or fillers based on silicon dioxide may be natural or synthetic silicas. Wollastonite is a calcium metasilicate whereas mica is a potassium alumino silicate. Clays may be employed as a primary filler; the two most common of which are kaolin and bentonite. Kaolin refers generally to minerals including kaolinite which is a hydrated aluminum silicate ($Al_2O_3.2SiO_2.2H_2O$) and is the major clay mineral component in the rock kaolin. Kaolin is also a group name for the minerals kaolinite, macrite, dickite and halloysite. Bentonite refers to hydrated sodium, calcium, iron, magnesium, and aluminum silicates known as montmorillonites which are also sometimes referred to as smectites.

A large number of siliceous materials may also be employed as a primary filler. These materials include diatomite, perlite, pumice, pyrophillite, silica, and talc. These minerals typically consist of an alkali metal oxide or alkaline earth element oxide, and silicon dioxide together with a minor amount of water and other elements. Talc, for example, includes from about 25% to about 35% MgO, 35–60% $SiO_2$ and about 5% $H_2O$.

Diatomite or kieselguhr is a sedimentary material formed by centuries of life cycles of aquatic diatoms, a simple plant in the algae family with an opaline silica cell wall. Thousands of species of diatoms have flourished and continue to do so in both marine and lacustrine environments. Fossilized skeletal remains of diatoms in commercial quantities are found in many parts of the world. Perlite is believed to result from hydration of volcanic glass or obsidian. Generally, hydration is about 2–5%; this water content is important to the expansibility of the perlite, influencing melting point and supplying expansion steam.

The rapid expansion of dissolved gases in silica lavas during volcanic eruptions produces the light density pumice or pumicite. The finer pumicite particles are transported by wind away from the source volcano, whereas pumice accumulates closer to the vent.

The hydrous aluminum silicate, pyrophilite, is formed by hydrothermal metamorphism of acid tuffs or braccias.

Silica sand is frequently obtained from the weathering of quartz-containing rock. Decomposition and disintegration of the rock with decomposition of other minerals leaves a primary quartz sand that has been concentrated by water movement. Induration of sands to sandstone results in another source for silica sand. Amorphous silica, or more properly cryptocrystalline or microcrystalline silica, is formed by the slow leaching of siliceous limestone or calcareous chert.

Talc is formed by the metamorphic (hydrothermal) alteration of magnesium silicates such as serpentine, pyroxene or dolomite.

The siliceous fillers are generally inert in most applications as shown by pH values in the range from about 6–10.

Sulfate minerals, such as gypsum and barite may likewise be employed as a primary filler. Gypsum is the name given to the mineral that consists of hydrous calcium sulfate ($CaSO_4 \cdot 2H_2O$), and also to the sedimentary rock that consist primarily of this mineral. In its pure state, gypsum contains 32.6% lime (CaO), 46.5% sulfur trioxide ($SO_3$), and 20.9% water. Single crystals and rock masses that approach this theoretical purity are generally colorless to white, but in practice, the presence of impurities such as clay, dolomite, silica and iron imparts a gray brown, red or pink color to the rock.

There are three common varieties of gypsum: selenite, which occurs as transparent or translucent crystals or plates; satin spar, which occurs as thin veins (typically white) of fibrous gypsum crystals; and alabaster, which is compact, fine-grained gypsum that has a smooth, even-textured appearance. Most deposits or rock gypsum that are suitable for industrial purposes are aggregates of fine to coarse gypsum crystals that have intergrown to produce a thick, massive sedimentary rock unit that is 90–98% gypsum. Alabaster is highly prized because of its uniformly fine particle size, but the more common deposits of rock gypsum consisting of coarser-grained selenite can generally be crushed and ground to produce a suitable filler and coating material.

Gypsum has a hardness of 2 on the Mohs scale, and can be scratched with the fingernail. Large rock masses are easily crushed and ground to a fine powder. The specific gravity of gypsum is about 2.31 and the refractive index is about 1.53. Gypsum is slightly soluble in water but it is an inert substance that resists chemical change. The oil-absorption capacity of gypsum is fairly low (0.17–0.25 $cm^3$ gel).

Raw or crude gypsum is one of the forms used as fillers and coatings, but for some purposes calcined or deadburned gypsum is desired. In calcining, the gypsum is heated to abut 120–160° C. to drive off free water and partially remove the water of crystallization. The calcined material or stucco, has a chemical composition of $CaSO_4 \cdot \frac{1}{2}H_2O$, and it readily takes up water. Calcination at higher temperatures (500–725° C.) results in a product called deadburned gypsum, which has a composition of $CaSO_4$.

Anhydrite, a sulfate mineral and rock that is closely associated with gypsum in nature and has minor uses as a filler, in anhydrous calcium sulfate ($CaSO_4$) containing 41.2% CsO and 58.8% $SO_3$. It is typically fine grained (like alabaster), and occurs in thick, massive sedimentary rock units. Anhydrite usually is white or bluish gray when pure, but it may be discolored by impurities. Anhydrite has a hardness of 3.5, a specific gravity of 2.98, and a refractive index of 1.57–1.61.

Thus, fillers commonly include:
Barium Salt
Barium Ferrite
Barium Sulfate
Carbon/Coke Power
Calcium Fluoride
Calcium Sulfate
Carbon Black
Calcium Carbonate
Ceramic Powder
Chopped Glass
Clay
Continuous Glass
Glass Bead
Glass Fiber
Glass Fabric
Glass Flake
Glass Mat
Graphite Powder
Glass Sphere
Glass Tape
Milled Glass
Mica
Molybdenum Disulfide
Silica
Short Glass
Talc
Whisker
Particulate fillers, besides mica, commonly include:
Glass
Calcium carbonate
Alumina
Beryllium oxide
Magnesium carbonate
Titanium dioxide
Zinc oxide
Zirconia
Hydrated alumina
Antimony oxide
Silica
Silicates
Barium ferrite
Barium sulphate
Molybdenum disulphide
Silicon carbide
Potassium titanate
Clays
Whereas fibrous fillers are commonly:
Whiskers
Glass
Mineral wool
Calcium sulphate
Potassium titanate
Boron
Alumina
Sodium aluminum
Hydroxy carbonate Suitably the extruded polymeric compositions include coloring agents for aesthetic appeal, preferably titanium dioxide, carbon black, and other opacifying agents in the range of 0.5–8 weight percent based on total composition, preferably 1.5 to 6.5 weight percent. The compositions may comprise minor amounts of other additives such as lubricants and antioxidants. These articles of manufacture may be suitably colored with pigments or dyes. Pigments are defined as small insoluble organic or inorganic particles dispersed in the resin medium to promote opacity or translucency. Usual pigments include carbon black, titanium dioxide, zinc oxide, iron oxides, and mixed metal oxides. Dyes are organic and soluble in the plastic, and may be used alone or in combination with pigments to brighten up pigment based colors. All such colorants may be used in a variety of modes which include dry color, conventional color concentrates, liquid color and precolored resin.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An injection blow-molded tumbler formed from a polymeric material including a copolymer of styrene and butadiene comprising: (a) a base defining a base diameter forming the bottom of said tumbler, the base also defining an outer edge thereof; (b) a sidewall integrally formed with said base extending upwardly from the outer edge thereof defining about its upper extremity an opening having a diameter generally larger than the base diameter provided with a fortified rim integrally formed with the sidewall in the form of a continuous solid polymer bead; wherein said fortified rim has a thickness from about 1.5 to about 6 times the thickness of the adjacent portion of said sidewall and wherein the volume of the injection blow-molded tumbler is from about 1.5 to about 4 times the volume of an injection molded parison from which it was prepared, and wherein further the sidewall defines a substantially straight profile extending between the base and the upper opening defined thereby.

2. An injection blow-molded tumbler formed from a polymeric material including a copolymer of styrene and butadiene comprising: (a) a base defining a base diameter forming the bottom of said tumbler, the base also defining an outer edge thereof; (b) a sidewall integrally formed with said base extending upwardly from the outer edge thereof having a thickness of from 5 to about 50 mils defining about its upper extremity an opening having a diameter generally larger than the base diameter provided with a fortified rim integrally formed with the sidewall in the form of a continuous solid polymer bead; (c) said sidewall extending upwardly with a taper of from about 1.0 to about 4.5 degrees, and wherein said fortified rim has a thickness from about 1.5 to about 6 times the thickness of the adjacent portion of said sidewall and wherein the volume of the injection blow-molded tumbler is from about 1.5 to about 4 times the volume of an injection molded parison from which it was prepared, and wherein further the sidewall defines a substantially straight profile extending between the base and the upper opening defined thereby.

3. The tumbler according to claim 2, wherein said sidewall extends upwardly with a taper of from about 2.75 to about 4 degrees.

4. The tumbler according to claim 3, wherein said sidewall extends upwardly with a taper of about 3 degrees.

5. The tumbler according to claim 2, wherein said fortified rim has a thickness and height of from about 3 to about 5 times the thickness of the adjacent portion of said sidewall.

6. An injection blow-molded tumbler formed from a polymeric material including a copolymer of styrene and butadiene comprising: (a) a base defining a base diameter forming the bottom of said tumbler, the base also defining an outer edge thereof; (b) a sidewall integrally formed with said base extending upwardly from the outer edge thereof having a thickness of from 5 to about 50 mils defining about its upper extremity an opening having a diameter generally longer than the base diameter provided with a fortified rim integrally formed with the sidewall in the form of a continuous solid polymer bead; (c) the volume of the injection blow-molded tumbler being from about 1.5 to about 4 times the volume of an injection molded parison from which it was prepared; wherein said fortified rim has a thickness of from about 1.5 to about 6 times the thickness of the adjacent portion of said sidewall and wherein said tumbler has a taper from about 1.0 to about 4.5 degrees, and (d) wherein further the sidewall is provided with a molded in design comprising a series of triangular ridges deeper in dimension than the wall caliper thus providing strength by way of corrugation and having a wall thickness the same as the rest of the tumbler, and the sidewall defines a substantially straight profile extending between the base and the upper opening defined thereby.

7. The tumbler according to claim 6, wherein the volume of said tumbler is from about 1.75 to about 3 times the volume of the injection molded parison from which it was prepared.

8. The tumbler according to claim 7, wherein the volume of the tumbler is about twice the volume of the injection molded parison from which it was prepared.

9. The tumbler according to claim 6, wherein said sidewall has a thickness of from about 10 to about 35 mils.

10. The tumbler according to claim 9, wherein the sidewall has a thickness of from about 15 to about 25 mils.

11. The tumbler according to claim 10, wherein the sidewall has a thickness of about 20 mils.

12. An injection blow-molded tumbler formed of an optically clear polymeric material including a copolymer of styrene and butadiene comprising: (a) a substantially circular base portion defining a base diameter, the base portion also defining an outer edge; (b) substantially cylindrical sidewall extending upwardly from the outer edge of the base portion having a thickness of from about 5 to about 50 mils defining about it supper extremity an opening having a diameter generally larger than the base diameter provided with a fortified rim integrally formed with the sidewall in the form of a continuous slid polymer bead; said sidewall extending upwardly with an angular taper with its central axis of from about 1.0 to about 4.5 degrees; said fortified rim having a thickness of from about 1.5 to about 6 times the thickness of the adjacent portion of said sidewall; said sidewall further including a pattern which alters the cylindrical character thereof over at least a portion of said sidewall which pattern is operative as a grip portion for a user and wherein the volume of the injection blow-molded tumbler is from about 1.5 to about 4 times the volume of an injection molded parison from which it was prepared, and the sidewall defines a substantially straight profile extending between the base and the upper opening defined thereby.

13. The tumbler according to claim 12, wherein a ratio of the height of the tumbler to the inside diameter of the upper portion of the sidewall is from about 2 to about 4.

14. The tumbler according to claim 13, wherein said ratio is about 3.

15. The tumbler according to claim 12, wherein said tumbler has contained volume of from about 12 to about 15 ounces.

16. The tumbler according to claim 12, wherein said tumbler defines an inner volume of about 14 ounces.

17. The tumbler according to claim 12, wherein said tumbler has a height of from about 5.75 to about 6 inches.

18. An injection blow-molded tumbler formed of a polymeric material including a copolymer of styrene and butadiene comprising: (a) a base defining a base diameter forming the bottom of said tumbler, the base also defining an outer edge thereof; (b) a sidewall integrally formed with said base extending upwardly from the outer edge having a thickness of from 5 to about 50 mils defining about its upper extremity an opening having a diameter generally larger than the base diameter provided with a fortified rim integrally formed with the sidewall in the form of a continuous solid polymer bead; said sidewall extending upwardly with taper of from about 2.5 to about 10 degrees; wherein said fortified rim has a thickness from about 1.5 to about 6 times the thickness of the adjacent portion of said sidewall; and wherein the volume of the injection blow-molded tumbler is from about 1.5 to about 4 times the volume of an injection molded parison from which it was prepared, and wherein further the sidewall defines a substantially straight profile extending between the base and the upper opening defined thereby.

19. The tumbler according to claim 18, wherein said sidewall extends upwardly with a taper of from about 4.5 to about 10 degrees.

20. The tumbler according to claim 19, wherein said sidewall extends upwardly with a taper of from about 4.5 to about 7.5 degrees.

21. The tumbler according to claim 18, wherein said fortified rim has a thickness and height of from about 3 to about 5 times the thickness of the adjacent portion of said sidewall.

22. An injection blow-molded tumbler formed of an optically clear polymeric material including a copolymer of styrene and butadiene comprising: (a) a base defining a base diameter forming the bottom of said tumbler, the base also defining an outer edge thereof; (b) a sidewall integrally formed with said base extending upwardly from the outer edge thereof having a thickness of from 5 to about 50 mils defining about its upper extremity an opening having a diameter generally larger than the base diameter provided with a fortified rim integrally formed with the sidewall in the form of a continuous solid polymer bead; the volume of the injection blow-molded tumbler being from about 1.5 to about 4 times the volume of an injection molded parison from which it was prepared; wherein said fortified rim has a thickness of from about 1.5 to about 6 times the thickness of the adjacent portion of said sidewall over a height of at least 2 mils; and (c) wherein further the sidewall is provided with a design comprised of wall embossments of at least as prominent as ½ the caliper of the sidewall, and the sidewall defines a substantially straight profile extending between the base and the upper opening defined thereby.

23. The tumbler according to claim 22 wherein the volume of said tumbler is from about 1.75 to about 3 times the volume of the injection molded parison from which it was prepared.

24. The tumbler according to claim 23 wherein the volume of the tumbler is about twice the volume of the injection molded parison from which it was prepared.

25. The tumbler according to claim 22 wherein said sidewall has a thickness of from about 10 to about 35 mils.

26. The tumbler according to claim 25 wherein the sidewall has a thickness of from about 15 to about 25 mils.

27. The tumbler according to claim 26 wherein the sidewall has a thickness of about 20 mils.

28. An injection blow-molded tumbler formed of an optically clear polymeric material including a copolymer of styrene and butadiene comprising: (a) a substantially circular base portion defining a base diameter, the base portion also defining an outer edge; (b) a substantially cylindrical sidewall extending upwardly from the outer edge of the base portion having a thickness of from 5 to about 50 mils defining about its upper extremity an opening having a diameter generally larger than the base diameter provided with a fortified rim integrally formed with the sidewall in the form of a continuous solid polymer bead; said sidewall extending upwardly with an angular taper with its central axis of from about 4.5 to about 10 degrees; said fortified rim having a thickness of from about 1.5 to 6 times the thickness of the adjacent portion of said sidewall; said sidewall further including a pattern which alters the cylindrical character thereof over at least a portion of said sidewall which pattern is operative as a grip for a user, and (c) wherein further the pattern comprises wall embossments at least as prominent as ½ the caliper of the sidewall, and the sidewall defines a substantially straight profile extending between the base and the upper opening defined thereby.

29. The tumbler according to claim 28 wherein a ratio of the height of the tumbler to the inside diameter of the upper portion of the sidewall is from about 1 to about 5.

30. The tumbler according to claim 29 wherein said ratio is from about 1.3 to about 1.7.

31. The tumbler according to claim 28 wherein the height of said tumbler is from about 4.6 to about 4.8 inches.

32. The tumbler according to claim 28 wherein the volume defined by said tumbler is from about 12 to about 16 ounces.

33. The tumbler according to claim 28 wherein the volume defined by said tumbler is about 15 fluid ounces.

34. An injection blow-molded tumbler formed of a polymeric material including a copolymer a styrene and butadiene comprising: (a) a base defining a base diameter forming the bottom of said tumbler, the base also defining an outer edge thereof; (b) a sidewall integrally formed with said base extending upwardly from the outer edge thereof having a thickness of from 5 to about 50 mils defining about its upper extremity an opening having a diameter generally larger than the base diameter provided with a fortified rim integrally formed with the sidewall in the form of a continuous solid polymer bead; said sidewall extending upwardly with a taper of from about 1 to about 10 degrees; wherein said fortified rim has a thickness from about 1.5 to about 6 times the thickness of the adjacent portion of said sidewall, said tumbler defining a volume of at least about 16 fluid ounces wherein the volume of the injection molded tumbler is from about 1.5 to about 4 times the volume of an injection molded parison from which it was prepared, and wherein further the sidewall defines a substantially straight profile extending between the base and the upper opening defined thereby.

35. The tumbler according to claim 34, wherein said sidewall extends upwardly with a taper of from about 2.75 to about 9 degrees.

36. The tumbler according to claim 35, wherein said sidewall extends upwardly with a taper of from about 5 to about 7 degrees.

37. The tumbler according to claim 34, wherein said fortified rim has a thickness and height of from about 3 to about 5 times the thickness of the adjacent portion of said sidewall.

38. An injection blow-molded disposable tumbler of an optically clear polymeric material including a copolymer of styrene and butadiene comprising: (a) a base defining a base diameter forming the bottom of said tumbler, the base also defining an outer edge thereof; (b) a sidewall integrally formed with said base extending upwardly from the outer edge having a thickness of from about 5 to about 50 mils defining about its upper extremity an opening having a diameter generally larger than the base diameter provided with a fortified rim integrally formed with the sidewall in the form of a continuous solid polymer bead; the volume of said injection molded tumbler being from about 1.5 to 4 times the volume of an injection molded parison from which it was prepared and said tumbler defining a volume of from about 16–20 fluid ounces; wherein said fortified rim has a thickness from about 1.5 to 6 times the thickness of the adjacent portion of said sidewall; and wherein said tumbler has a taper from about 2.5 to about 10 degrees, and wherein further the sidewall defines a substantially straight profile extending between the base and the upper opening defined thereby.

39. The injection blow-molded tumbler according to claim 1, wherein the amount of butadiene residue in said copolymer is from about 2 to about 40 percent by weight.

40. The injection blow-molded tumbler according to claim 1, wherein the amount of butadiene residue in said copolymer is from about 15 to about 30 percent by weight.

41. The injection blow-molded tumbler according to claim 1, wherein said tumbler consists essentially of styrene-butadiene copolymer blended with styrene.

42. The injection blow-molded tumbler according to claim 1, wherein said polymeric material consists of a blend of polystyrene with a copolymer of styrene and butadiene.

43. The injection blow-molded tumbler according to claim 1, including an impact modifier selected from the group consisting of core shell polymers, olefin containing copolymers, rubber polymers and copolymers, styrene containing copolymers, and mixtures thereof.

44. The injection blow-molded tumbler according to claim 1, formed from a polymeric material including a mineral filler wherein said mineral filler is present in an amount of from about 5 to about 50 wt. %.

45. The injection blow-molded tumbler according to claim 44, wherein said mineral filler is present in an amount of from about 8 to about 20 wt. %.

46. The injection blow-molded tumbler according to claim 45, wherein said mineral filler is present in an amount of from about 10 to about 15 wt. %.

47. The injection blow-molded tumbler according to claim 1, wherein the polymer bead forming the fortified rim has a curved profile.

48. The injection blow-molded tumbler according to claim 47, wherein the polymer bead forming the fortified rim has a circular profile.

* * * * *

UNITED STATES PATENT AND TRADEMARK OFFICE
CERTIFICATE OF CORRECTION

PATENT NO. : 6,866,905 B1
DATED : March 15, 2005
INVENTOR(S) : Erland R. Sandstrom et al.

It is certified that error appears in the above-identified patent and that said Letters Patent is hereby corrected as shown below:

Column 1,
Line 53, delete "A" before "molded";
Line 54, after "rim" insert -- 20 --;
Line 58, change "an" to -- any --;

Column 3,
Line 50, change "blow mold" to -- blow-mold --;
Line 55, change "form" to -- from --;

Column 5,
Line 22, change ";" to -- : --;

Column 9,
Lines 8-9, change "polyvinylchlroide" to -- polyvinylchloride --;

Column 10,
Line 27, delete "and";
Line 29, delete "." after "invention" and insert -- ; --;
Line 63, delete "is" after "injection";

Column 11,
Line 39, insert -- . -- after "14";
Line 39, insert -- Sidewall 14 -- before "extends";
Line 42, insert -- of -- after "18";
Line 55, insert -- and -- after "2.770 inches";
Line 63, insert -- . -- after "22";
Line 63, delete "the" and insert -- The --;

Column 12,
Line 60, insert -- 3°. -- after "of";

UNITED STATES PATENT AND TRADEMARK OFFICE
CERTIFICATE OF CORRECTION

PATENT NO.     : 6,866,905 B1
DATED          : March 15, 2005
INVENTOR(S)    : Erland R. Sandstrom et al.

It is certified that error appears in the above-identified patent and that said Letters Patent is hereby corrected as shown below:

Column 13,
Line 22, change "$W_a$" to -- $W_b$ --;
Line 23, change "$W_b$" to -- $H_b$ --;
Line 26, insert -- is -- before "rounded";
Line 27, change "to" to -- do --;
Line 33, change "section" to -- sections --;
Line 40, insert -- . -- after "685d";
Line 40, change "this" to -- This --;
Line 53, change "40" to -- 561 --;
Line 61, change "proving" to -- providing --;

Column 14,
Line 18, insert -- is -- before "attached";
Line 36, change "d1" to -- D1 --;
Line 38, change "34" to -- 634 --;
Line 41, change "40" to -- 640 --;
Line 59, change "7(c)" to -- 7(b) --;

Column 15,
Line 6, change "242" to -- 718 --;
Line 23, change "736" to -- 735 --;
Line 47, change "following:" to -- following. --;

Column 16,
Line 13, delete "(b)";
Line 27, change "though" to -- thought --;
Line 27, delete the 2nd instance of "of";
Line 45, insert -- . -- after "D ";
Line 45, change "the" to -- The --;
Line 49, change "W " to -- W --;

Column 17,
Line 22, change "section" to -- sections --;

Column 18,
Line 14, change "rapidly" to -- rapid --;
Line 60, change "21" to -- 921 --;
Line 61, change "11" to -- 911 --;
Line 62, delete "as";

UNITED STATES PATENT AND TRADEMARK OFFICE
CERTIFICATE OF CORRECTION

PATENT NO. : 6,866,905 B1
DATED : March 15, 2005
INVENTOR(S) : Erland R. Sandstrom et al.

It is certified that error appears in the above-identified patent and that said Letters Patent is hereby corrected as shown below:

Column 19,
Line 30, change "935" to -- 934 --;

Column 22,
Line 67, change "closed to vacuum, open to pressureclosed to pressure," to -- closed to vacuum; open to pressure; closed to pressure; --;

Column 23,
Line 1, change "atmosphereclosed to pressure," to -- atmosphere closed to pressure; --;

Column 26,
Line 5, change "110" to -- 1010 --;
Line 54, change "950" to -- 50 --;

Column 27,
Line 56, change "heir" to -- their --;

Column 28,
Line 24, change "a, a" to -- , --;
Line 33, change "2--2-bis-3,5-" to -- 2,2-bis-(3,5 --;
Line 34, change "propane and" to -- propane, --;
Line 54, delete "let, 15";
Line 61, change "Specifications" to -- Specification --;

Column 31,
Line 27, change "1,00" to -- 1,000 --;

Column 33,
Table 2, line 52, change "or" to -- of --;

Column 37,
Line 37, delete "1";

Column 38,
Table 6, line 5, change "Lbf-in" to -- (lbf-in) --;

Column 39,
Line 52, change "abut" to -- about --;
Line 61, change "in" to -- is --;

UNITED STATES PATENT AND TRADEMARK OFFICE
CERTIFICATE OF CORRECTION

PATENT NO. : 6,866,905 B1
DATED : March 15, 2005
INVENTOR(S) : Erland R. Sandstrom et al.

It is certified that error appears in the above-identified patent and that said Letters Patent is hereby corrected as shown below:

Column 40,
Line 6, change "Power" to -- Powder --;

Column 42,
Line 49, change "it supper" to -- its upper --;
Line 52, change "slid" to -- solid --;

Column 45,
Line 12, insert -- about -- before "4";
Line 16, insert -- about -- before "6"; and Column 46,
Line 3, change "styrene" to -- polystyrene --.

Signed and Sealed this

Sixteenth Day of August, 2005

JON W. DUDAS
*Director of the United States Patent and Trademark Office*